(12) United States Patent
McElroy et al.

(10) Patent No.: US 8,019,680 B2
(45) Date of Patent: Sep. 13, 2011

(54) ALTERING CARD-ISSUER INTERCHANGE CATEGORIES

(75) Inventors: Alan Wayne McElroy, Bellevue, WA (US); Thomas P. Parrish, Spokane, WA (US); Kelly Birr, Bellevue, WA (US)

(73) Assignee: PE Systems, LLC, Spokane, WA (US)

( * ) Notice: Subject to any disclaimer, the term of this patent is extended or adjusted under 35 U.S.C. 154(b) by 25 days.

(21) Appl. No.: 12/577,658

(22) Filed: Oct. 12, 2009

(65) Prior Publication Data

US 2010/0030634 A1    Feb. 4, 2010

Related U.S. Application Data

(63) Continuation of application No. 11/740,190, filed on Apr. 25, 2007, now Pat. No. 7,603,312.

(51) Int. Cl.
*G06Q 40/00* (2006.01)

(52) U.S. Cl. ........................................................ 705/39

(58) Field of Classification Search ............... 705/35–42
See application file for complete search history.

(56) References Cited

U.S. PATENT DOCUMENTS

| | | | |
|---|---|---|---|
| 6,006,205 A | 12/1999 | Loeb et al. | |
| 6,169,974 B1 * | 1/2001 | Baumgartner et al. | 705/39 |
| 6,243,688 B1 * | 6/2001 | Kalina | 705/14.18 |
| 6,999,943 B1 * | 2/2006 | Johnson et al. | 705/39 |
| 7,499,887 B2 * | 3/2009 | Boyle et al. | 705/40 |
| 7,603,312 B2 | 10/2009 | McElroy et al. | |
| 7,624,068 B1 * | 11/2009 | Heasley et al. | 705/38 |
| 7,627,521 B1 * | 12/2009 | Sheehan et al. | 705/38 |
| 7,660,765 B1 * | 2/2010 | Sheehan et al. | 705/39 |
| 7,676,409 B1 * | 3/2010 | Ahmad | 705/35 |
| 7,730,321 B2 | 6/2010 | Gasparini et al. | |
| 7,752,134 B2 * | 7/2010 | Spear | 705/41 |
| 2002/0069176 A1 * | 6/2002 | Newman | 705/53 |
| 2002/0138316 A1 | 9/2002 | Katz et al. | |
| 2002/0138428 A1 * | 9/2002 | Spear | 705/41 |
| 2002/0170959 A1 * | 11/2002 | Madani | 235/380 |
| 2002/0186249 A1 | 12/2002 | Lu | |
| 2004/0088238 A1 * | 5/2004 | Gilson et al. | 705/35 |
| 2005/0027648 A1 * | 2/2005 | Knowles et al. | 705/38 |
| 2005/0049963 A1 * | 3/2005 | Barry | 705/39 |
| 2006/0116955 A1 * | 6/2006 | Strayer et al. | 705/39 |
| 2006/0122932 A1 | 6/2006 | Birtwell et al. | |
| 2006/0136315 A1 * | 6/2006 | Muthiki et al. | 705/35 |
| 2006/0149671 A1 * | 7/2006 | Nix et al. | 705/40 |
| 2006/0155672 A1 | 7/2006 | Lee et al. | |
| 2007/0051794 A1 * | 3/2007 | Glanz et al. | 235/379 |
| 2007/0208751 A1 | 9/2007 | Cowan et al. | |

(Continued)

OTHER PUBLICATIONS

"Visa announcing easing of retailer fees", Anonymous, National Petroleum News. Chicago: Dec. 2005, vol. 97, iss 13; p. 12.*

(Continued)

*Primary Examiner* — Ella Colbert
*Assistant Examiner* — Mohammad Z Shaikh

(57) ABSTRACT

This document describes tools capable of determining ways in which to alter interchange categories assigned to credit-card transactions. In some embodiments, the tools receive parameters for interchange categories and transaction information for a client (e.g., one or more merchants) that has been charged interchange fees based on some of these categories. The tools may determine, based on these parameters and transaction information, how parameters may be changed to enable similar credit-card transactions to be assigned a lower-cost interchange category and the accompanying potential fee savings.

24 Claims, 9 Drawing Sheets

U.S. PATENT DOCUMENTS

| | | |
|---|---|---|
| 2008/0185429 A1 | 8/2008 | Saville |
| 2008/0270275 A1* | 10/2008 | McElroy et al. ............... 705/35 |
| 2008/0270297 A1 | 10/2008 | McElroy |
| 2008/0270298 A1 | 10/2008 | McElroy |
| 2008/0306837 A1 | 12/2008 | Rae et al. |
| 2009/0281944 A1 | 11/2009 | Shakkarwar |
| 2009/0327124 A1 | 12/2009 | McElroy |
| 2010/0094671 A1 | 4/2010 | Oaks |
| 2011/0010290 A1 | 1/2011 | McElroy |

OTHER PUBLICATIONS

"Merchant Discount Fees," Anonymous, The Nilson Report. Los Angeles: May 2005, iss 883; p. 1.*

"Regulation-Interchange: New deals to cut interchange", Electronic Payments International. London: Jan 2006. p. 8.*

Bosworth, Martin, H. "MasterCard Offers Concessions in Interchange Fee Battle" Consumer Affairs.com Inc, http://www.consumeraffairs.com/printme.php?url=/news04/2006/09/mastercard_fees.html, Sep. 6, 2006, downloaded Jul. 16, 2007, 3 pages.*

Shearman, J.C., "Retailers Urge State Efforts on $36 Billion Credit Card Fee", National Retail Federation: The Voice of Retail Worldwide, http://www.nrf.com/moduels.php?name=News&sp_id=270&op=printfriendly&txt=Nation,2006,downloaded Jul. 16, 2007, 3 pages.*

"Mastercard puts securecode rates for online merchants", Cardline 2005, vol. 5 issue 45, pN.PAG, Op, 3 pages.*

Reid, Keith, "Convenience Store", NPN, National Petroleum News. Chicago: Oct. 2005. vol. 97, iss. 11; p. 58, 3 pgs.*

"A real opportunity for merchants to save money on credit card fees", The Merchant Guide, http://www.themerchantsguide.com/benefits-savings-money.html, downloaded May 26, 2008, 3 pages.*

Breitkopf, David, "Australia's Central Bank Wins a Legal Battle over Fee Plan", American Banker. New York, N.Y. Dec. 1, 2005. vol. 170, Iss. 229; p. 6.*

Lindenmayer, Isabelle, "U.K. Says Mastercard Should Reduce Interchange", AmericanBanker. New York, N.Y. Sep. 7, 2005. vol. 170, Iss. 172; p. 8.*

Kanter, James, "Visa Nears Settlement over Fees: Credit Card Company is Expected to Agree to Lower Merchant Rates", The Wall Street Journal Europe. Brussels: Jul. 22, 2002. p. A.3.*

"Final Office Action", U.S. Appl. No. 11/740,143, (Dec. 3, 2009),9 pages.

"Final Office Action", U.S. Appl. No. 11/740,172, (Jan. 8, 2010),18 pages.

"Final Office Action", U.S. Appl. No. 11/740,172, (Jun. 9, 2010),16 pages.

"Visa announces easing of retailer fees", National Petroleum News, Chicago. Proquest, vol. 97, Iss. 13,(Dec. 2005),12.

McElroy, Alan et al., "Statement of Actions Performed by Alan McElroy and/or PE Systems", (Apr. 24, 2006).

"Non-Final Office Action", U.S. Appl. No. 11/740,143, (Nov. 24, 2008),8 pages.

"Non-Final Office Action", U.S. Appl. No. 11/740,172, (Jun. 20, 2008),10 Pages.

"Final Office Action", U.S. Appl. No. 11/740,172, (Feb. 2, 2009),14 Pages.

"Non-Final Office Action", U.S. Appl. No. 11/740,190, (Jun. 26, 2008),19 pages.

"Non-Final Office Action", U.S. Appl. No. 11/740,190, (Feb. 5, 2009),16 Pages.

"Non Final Office Action", U.S. Appl. No. 11/740,143, (Jun. 4, 2009),8 pages.

"Non Final Office Action", U.S. Appl. No. 11/740,172, (Jun. 10, 2009),15 pages.

"Merchant Discount Fees", *Abstract, Iss 833,* The Nilson Report, Los Angeles,(May 2005),1 Page.

"Regulation-Interchange: New deals to cut interchange", Electronics Payments International. London.,(Jan. 2008),3 pages.

"Mastercard cuts securecode rates for online merchants", *Abstract,* Cardline 2004, vol. 5 issue 45, pN.PAG.,(2004),3 pages.

"Notice of Allowance", U.S. Appl. No. 11/740,190, (Aug. 7, 2009),15 pages.

"Non-Final Office Action", U.S. Appl. No. 12/554,691, (Jan. 11, 2011),6 pages.

"Non-Final Office Action", U.S. Appl. No. 12/650,996, (Feb. 2, 2011),7 pages.

"Non-Final Office Action", U.S. Appl. No. 11/740,172, (Mar. 2, 2011),19 pages.

"Notice of Allowance", U.S. Appl. No. 12/554,691, filed (May 12, 2011), 7 pages.

"Non-Final Office Action", U.S. Appl. No. 12/250,185, filed (Jun. 8, 2011), 26 pages.

"Notice of Allowance", U.S. Appl. No. 12/650,996, filed (Jun. 8, 2011), 12 pages.

* cited by examiner

ALTERING CARD-ISSUER INTERCHANGE CATEGORIES

RELATED APPLICATIONS

This application is a continuation of and claims priority to U.S. patent application Ser. No. 11/740,190, entitled "Altering Card-Issuer Interchange Categories," filed on Apr. 25, 2007, the disclosure of which is incorporated in its entirety by reference herein.

BACKGROUND

In many typical credit-card transactions, a consumer purchases a product or service from a merchant using a VISA®- or MasterCard®-branded credit card. To complete the transaction, the merchant receives an authorization from a third party, known as a "merchant processor," which is sponsored by a VISA®- or MasterCard®-member bank. Merchants typically select a merchant processor to install point-of-sale equipment, train the merchant's staff in the use of the equipment, access the credit-card network for authorizations, and process the merchant's credit-card transactions.

The merchant processor, through its sponsoring bank, reimburses the merchant for each transaction after deducting transaction fees. Within these transaction fees are the merchant processor's processing fee, the interchange fees paid to the issuer of the credit card, and the assessment fees that are paid to the credit-card association. The merchant processor submits the net transaction into the card association's settlement network in order to be reimbursed by the issuing bank. The VISA® and MasterCard® associations are responsible for building, operating, maintaining, authorizing, and providing the information required for the member banks to settle their net transaction volume. Each association receives an assessment fee from both the merchant processor's bank and the issuer's bank for each credit-card transaction processed through their respective network. The issuer in turn bills the consumer the full amount of the original charge.

Card issuers charge interchange fees based on interchange categories that each assigns to credit-card transactions. The card issuers, however, may assign each transaction to one of over 100 different interchange categories. Understanding these different interchange categories can be quite difficult for merchants, often resulting in merchants being overcharged or at the least not knowing how best to reduce these fees in the future. The potential savings merchants could enjoy can be substantial—card issuers currently charge merchants billions of dollars a year in interchange fees worldwide.

These interchange categories are difficult to understand in part because there are so many different kinds. Some are based on the merchant's retail industry status, some on the type of card presented for payment, some on the process used by the merchant to gain authorization for the transaction, some on the type of information received, and many on a combination of these factors. The interchange categories (and thus the rate charged) may depend, for example, on whether the consumer's and card's data is processed electronically from the magnetic strip on the back of the card, manually by the merchant based on the information set forth on the card, or manually by the merchant based on information provided by the consumer over the telephone. In short, the number and complexity of these categories make it difficult for a merchant to reduce its interchange-category fees.

Not only are the interchange categories themselves often difficult to understand, the effect of these interchange categories may be difficult to track because of the sheer number of transactions received by merchants; some merchants receive hundreds of thousands of transactions a month. Many merchants simply do not have the extraordinary manpower or expertise often needed to analyze these transactions to figure out how much they may save—even if they did understand how to change the categories assigned to their transactions.

Further still, merchant processors—the companies that have good information about interchange categories and their fees—often have no incentive to help merchants reduce these fees; most merchant processors make no more money by providing details about these complexities than not doing so and some may even lose money by providing these details.

SUMMARY

This document describes tools capable of determining ways in which to alter interchange categories assigned to credit-card transactions. In some embodiments, the tools receive parameters for interchange categories and transaction information for clients (e.g., one or more merchants) that have been charged interchange fees based on some of these categories. The tools may determine, based on these parameters and transaction information, how parameters may be changed to enable similar credit-card transactions to be assigned a lower-cost interchange category and the accompanying potential fee savings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Overview

Figure 1:
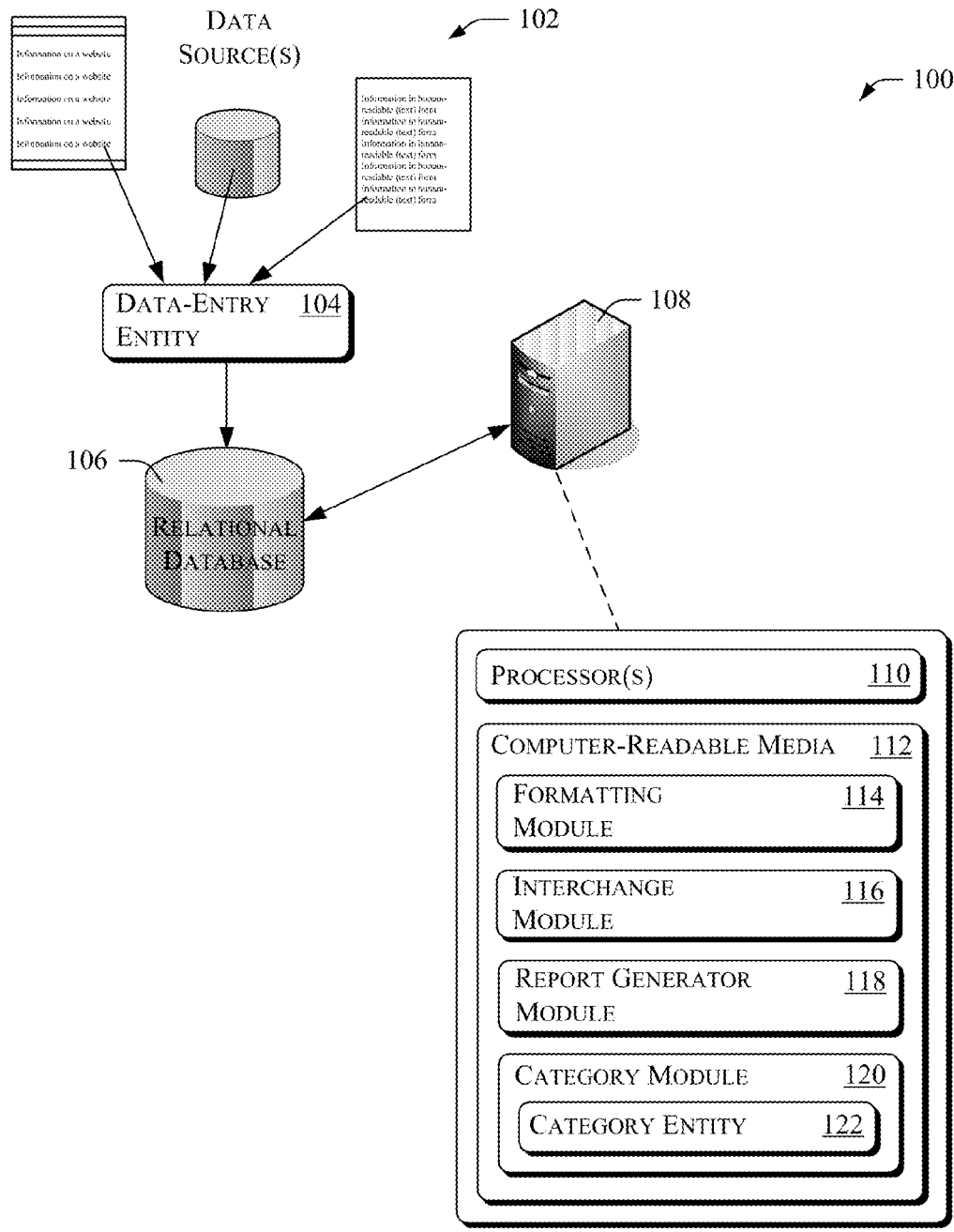
FIG. 1 illustrates an example operating environment in which various embodiments of the tools may operate.

The following document describes tools capable of determining ways in which to alter interchange categories assigned to credit-card transactions and accompanying potential fee savings, as well as other capabilities. In some cases the tools determine ways in which to alter interchange categories by receiving parameters for interchange categories and determining lower-cost interchange categories available to a client if the client implements one or more parameter changes, such as gaining a customer's signature or entering additional information. In some embodiments, a client may include one or more merchants. While certain embodiments herein are discussed with reference to a merchant or merchants, this is not intended to be limiting, and the described tools may be implemented for any suitable entity without departing from the spirit and scope of the claimed embodiments.

The tools discussed herein may also receive information indicating, for a particular area of business, potential lower-cost interchange categories and, based on a client's currently-assigned interchange categories, determine which currently-assigned interchange categories may be replaced by these lower-cost interchange categories. In either case, the tools may determine and provide potential fee savings based on the lower-cost interchange categories being assigned instead of the current interchange categories. By so doing the tools may save clients significant amounts of money by helping them lower their interchange fees.

An environment in which the tools may enable these and other actions is set forth below in a section entitled Example Operating Environment. This section is followed by Storing Credit-Card Transaction Data, which describes one particular example in which the tools act to enable an interchange module to receive credit-card transaction data and perform other actions for a national bookstore chain. The next section, entitled Building and Adjusting Baseline Interchange Rates, continues the bookstore example in the context of building and adjusting a baseline interchange rate for the national bookstore chain. The next section, entitled Determining Ways in which to Alter Interchange Categories, continues the bookstore example in the context of determining ways in which to have a lower-cost interchange category assigned instead of a higher-cost interchange category, as well as the accompanying potential savings.

The following section also continues the bookstore example and determines a savings between an adjusted baseline interchange rate and a current rate; it is entitled Determining Card-Issuer Interchange-Fee Savings. The next section, entitled Auditing Interchange Categories, continues the example but from the Storing section, and describes ways in which the tools audit interchange categories assigned to credit-card transactions. A final section describes various other embodiments and manners in which the tools may act and is entitled Other Embodiments of the Tools. This overview, including these section titles and summaries, is provided for the reader's convenience and is not intended to limit the scope of the claims or the entitled sections.

Example Operating Environment

Before describing the tools in detail, the following discussion of an example operating environment is provided to assist the reader in understanding some ways in which various inventive aspects of the tools may be employed. The environment described below constitutes but one example and is not intended to limit application of the tools to any one particular operating environment. Other environments may be used without departing from the spirit and scope of the claimed subject matter.

FIG. 1 illustrates one such operating environment generally at 100 having data sources 102, a data-entry entity 104, a relational database 106, and a computing device 108. Communications between these entities are shown with arrows.

The data sources may include text-formatted documents easily readable by humans (e.g., paper), websites, or accessible databases, to name a few. The data-entry entity is responsible for retrieving information from the data sources and storing it in the relational database. This entity may include a person reading information from a paper document or website and typing the information into an application through which information is stored in intermediate memory or directly into the relational database, an application using Application Program Interfaces (APIs) to access API-accessible databases or applications and store information, or a Bot (an Internet-searching data gatherer) capable of gleaning information from websites and other data sources over the Internet. This entity may store information automatically and/or without user interaction in many cases, such as when it includes an application using APIs or a Bot.

The relational database includes one or more databases in which data may be stored and from which data may be extracted, such as a SQL™, Oracle™, or IBM™ DB2 relational database.

The computing device includes one or more processor(s) 110 and computer-readable media 112. The computing device is shown with a server icon, though it may comprise one or multiple computing devices of various types. The processors are capable of accessing and/or executing the computer-readable media.

The computer-readable media includes or has access to a formatting module 114, an interchange module 116, a report generator module 118, a category module 120, and a category entity 122. Each of these modules and the category entity (except when the category entity is or includes non-software elements) may be integral or separate; they are shown separate to aid in describing functionality and actions of each, though this is not required.

In many cases credit-card transaction data is provided in a format or formats that are not easily readable by the interchange module or are not consistent. In these cases the formatting module may transform the information into one, easily-machine-usable format, often prior to loading it into the relational database. In one example case described in greater detail below, the formatting module includes an executable Extract, Transform, and Load (ETL) package. This ETL package may extract human-readable, text-formatted (e.g., pre-transformed) credit-card transaction data of one or multiple formats, transform this data into a format easily-usable by the interchange module, and load it into the rational database in a standardized format that may be used for computation.

The interchange module is capable of auditing and/or tracking reductions to interchange fees charged to merchants incident to those merchants accepting payments with credit cards. Note that the term "credit" includes credit, debit, and other accounting systems so long as they are processed by a credit or debit association (e.g., VISA® and MasterCard®). Also note that the term "card" applies to any medium or manner in which sales or purchases may be electronically transacted, such as a card having a magnetic strip, a card having circuitry, a credit account not having any physical element, or a key-faub that electromagnetically identifies an account. Ways in which the interchange module may audit and/or track fee reductions are developed in greater detail below.

The report generator module is capable of receiving information from the interchange module and the category module and providing reports on this information in human or computer-readable formats.

The category module is capable of determining ways in which to alter interchange categories assigned to credit-card transactions and accompanying potential fee savings, as well as providing information indicating its findings (e.g., to the report generator module). The category module may include, have access to, or interact with the category entity. As will be described in detail below, the category entity may perform some of the actions and functions of the category module and may be software (e.g., an application, applet, or other code), or a person, or a combination of both.

Various techniques described herein may be implemented via computer-executable instructions stored on computer-readable storage media. "Computer-readable storage media" include volatile and non-volatile, removable and non-removable media implemented in any method or technology for storage of information such as computer readable instructions, data structures, program modules, or other data. As used herein, computer-readable storage media of a computing device are configured to store information and thus do not include a signal bearing medium or other transitory media.

Storing Credit-Card Transaction Data

This section describes one particular example in which the tools act to store credit-card transaction data and enable the interchange module to receive this data. This example is an implementation of the tools but is not intended to limit the scope of the tools or the claimed embodiments.

The credit-card transaction data that the tools enable the interchange module to receive includes information about credit-card transactions (e.g., customers purchasing a product or service from a merchant using a credit card). This credit-card transaction data may include, for each purchase or groups of purchases, the purchase price, the date of the purchase or date that the purchase was batched by the merchant, a card-issuer interchange category, fee, or rate for the purchase, and through which credit-card association's network the purchase was made (e.g., VISA® or MasterCard®). The data may also indicate each purchase and its interchange category or groups of purchases by their interchange category, some of which are noted later in the discussion.

Parameters used to determine the category may also be included in the credit-card transaction data or determined based on information in the credit-card transaction data. These parameters may be divided, conceptually, into four categories: 1) a merchant's area of business; 2) information received for a transaction; 3) how information is received for a transaction; and 4) type of card used in a transaction. These parameters are described in greater detail below.

Figure 2:
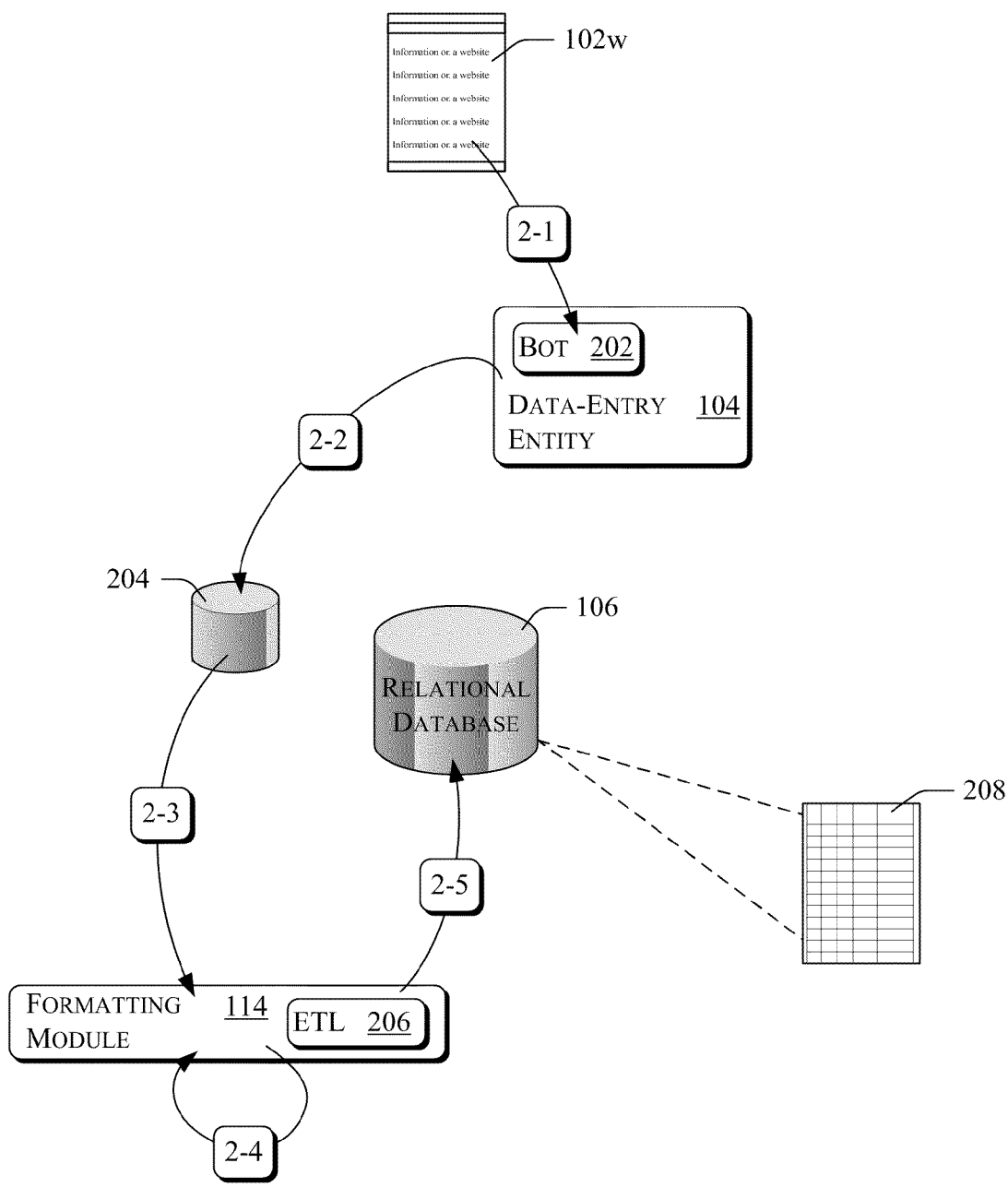
FIG. 2 illustrates an example flow diagram in which the tools act to enable the interchange module to receive credit-card transaction data and other information.

Having described the credit-card transaction data generally, the example turns to FIG. 2. FIG. 2 shows actions and interactions of and between elements of operating environment 100 of FIG. 1, as well as some results of these actions and interactions.

At arrow 2-1 in FIG. 2, a Bot 202 included in data-entry entity 104 gleans credit-card transaction data from a merchant processor's website 102w. Merchant processors often present credit-card transaction data to merchants on a website in a human-readable text format. Note that the Bot may glean credit-card transaction data for many if not thousands of merchants automatically and without user interaction through merchant-processors websites. In this example the data-entry entity gleans credit-card transaction data for all merchants associated with a particular client—here a national bookstore chain. A client may have one merchant or may have hundreds or thousands, depending on the size of the business.

The example national bookstore chain is assumed to have, for each bookstore, a merchant at its coffee shop, merchants at its check-out line, and a merchant at its service counter. This national bookstore also has merchants accessible through the Internet for website purchases. Assume that the national bookstore has 200 stores and 2,000 merchants. Each of the merchants may have hundreds or thousands of credit-card transaction per billing period, amounting to 800,000 to 8,000,000 credit-card transactions per billing period (e.g., a calendar month). As this number suggests, it is difficult for clients to keep track of all credit-card transactions in a billing period by reading merchant-processor statements on websites, on paper, or in human-readable text formats.

Consider the following example merchant-processor statement in human-readable text format. This processor statement is presented at the merchant processor's website 102w of FIG. 2. This statement includes credit-card transaction data for just one merchant during just one billing cycle.

5/31/05    1923    1923920009
Merchant Processor
Merchant Processor's Address
Merchant Processor's Identification Number
Merchant
Merchant's Address
Merchant's Identification Number: 932734932

PLAN SUMMARY

| PL | # SALES | $ SALES | # CREDITS | $ CREDITS | NET SALES | AVG TKT | DISC P/I | % | DISCOUNT DUE |
|---|---|---|---|---|---|---|---|---|---|
| V | 997 | 52,203.43 | 26 | 925.68 | 51,277.75 | 52.36 | .130 | .000 | 129.61 |
| M | 1574 | 77,488.14 | 40 | 1,180.06 | 76,308.08 | 49.23 | .130 | .000 | 204.62 |
| DS | 298 | 16,210.99 | 17 | 583.77 | 15,627.22 | 54.40 | .000 | .000 | .00 |
| ** | 2869 | 145,902.56 | 83 | 2,689.51 | 143,213.05 | 50.85 | | | 334.23 |

| DAY | REF NO. | * | PL | #SALES | $SALES | $CREDITS | DIS.PD | NET DEPOSIT |
|---|---|---|---|---|---|---|---|---|
| 01 | 52106000034 | D | T | 76 | 3,695.36 | 136.59 | .00 | 3,558.77 |
| 02 | 52106100038 | D | T | 73 | 4,028.78 | 39.33 | .00 | 3,989.45 |
| 03 | 52106200038 | D | T | 64 | 4,709.22 | .00 | .00 | 4,709.22 |
| 04 | 52106300037 | D | T | 95 | 4,131.47 | 87.09 | .00 | 4,044.38 |
| 06 | 52106400038 | D | T | 97 | 4,440.53 | 119.75 | .00 | 4,320.78 |
| 06 | 52106500036 | D | T | 149 | 9,125.75 | 84.94 | .00 | 9,040.81 |
| 07 | 52106600038 | D | T | 63 | 2,500.94 | 57.31 | .00 | 2,443.63 |
| 08 | 52106700037 | D | T | 92 | 4,395.07 | 150.35 | .00 | 4,244.72 |
| 09 | 52106800038 | D | T | 77 | 3,466.22 | 54.15 | .00 | 3,412.07 |
| 10 | 52106900038 | D | T | 78 | 3,445.58 | 18.05 | .00 | 3,427.53 |
| 11 | 52107000037 | D | T | 87 | 3,442.54 | 65.83 | .00 | 3,376.71 |
| 13 | 52107100037 | D | T | 87 | 4,151.55 | 358.95 | .00 | 3,792.60 |
| 13 | 52107200037 | D | T | 117 | 6,766.41 | 5.29 | .00 | 6,761.12 |
| 14 | 52107300036 | D | T | 88 | 4,406.70 | 63.72 | .00 | 4,342.98 |
| 15 | 52107400038 | D | T | 76 | 2,070.91 | 35.54 | .00 | 2,035.37 |
| 16 | 52107500038 | D | T | 94 | 4,606.75 | 62.78 | .00 | 4,543.97 |
| 17 | 52107600036 | D | T | 90 | 3,568.66 | 7.43 | .00 | 3,561.23 |
| 18 | 52107700040 | D | T | 122 | 5,764.02 | 174.37 | .00 | 5,589.65 |
| 20 | 52107800038 | D | T | 119 | 5,803.97 | 44.70 | .00 | 5,759.27 |
| 21 | 52108000039 | D | T | 230 | 15,854.65 | 32.97 | .00 | 15,821.68 |
| 22 | 52108100040 | D | T | 111 | 5,544.80 | 232.06 | .00 | 5,312.74 |
| 23 | 52108200037 | D | T | 93 | 4,199.12 | 141.67 | .00 | 4,057.45 |
| 24 | 52108300040 | D | T | 76 | 2,660.72 | 128.79 | .00 | 2,531.93 |
| 25 | 52108400038 | D | T | 71 | 2,764.74 | 12.74 | .00 | 2,752.00 |
| 27 | 52108500040 | D | T | 112 | 7,216.82 | 39.55 | .00 | 7,177.27 |
| 27 | 52108600038 | D | T | 134 | 7,511.06 | 219.85 | .00 | 7,291.21 |
| 29 | 52108800040 | D | T | 107 | 5,101.36 | 134.45 | .00 | 4,966.91 |
| 31 | 52109000040 | D | T | 191 | 10,528.86 | 181.26 | .00 | 10,347.60 |

DEPOSIT TOTALS    2,869    145,902.56    2,689.51    .00    143,213.05

AMOUNT DEDUCTED FROM ACCOUNT    2,725.61

FEES

| NUMBER | AMOUNT | DESCRIPTION | TOTAL |
|---|---|---|---|
| | | SUPPORT PACKAGE | 5.95 |
| 02 | 14.00 | TERMINAL FEE | 28.00 |
| 10 | 586.95 | VISA® STANDARD (2.63%XSALES+$.10XITEMS) | 16.44 |
| 350 | 12,452.24 | VISA® RTL CK DB (1.05%XSALES+$.15XITEMS) | 183.25 |
| 461 | 27,404.65 | VISA® CPS RETAIL (1.54%XSALES+$.10XITEMS) | 468.13 |
| 57 | 3,431.71 | VISA® EIRF (2.14%XSALES+$.10XITEMS) | 79.14 |
| 16- | 662.12- | VISA® CREDIT CONSUMER CARD @ 1.67% | 11.06- |
| 01- | 6.37- | VISA® CREDIT COMMERCIAL CARD @ 2.24% | .14- |
| 47 | 1,716.92 | VISA® EIRF DB (1.75%XSALES+$.20XITEMS) | 39.45 |
| 02 | 92.90 | VISA® STANDARD DB(1.90%XSALES+$.25XITEMS) | 2.27 |
| 09- | 257.19- | VISA® CV-CNSR DB (1.31%XSALES) | 3.37- |
| | 52,203.43 | VISA® DUES AND ASSESSMENTS (.0925%XSALES) | 48.29 |
| 10 | 1,577.69 | MC STANDARD (2.70%XSALES+$.10XITEMS) | 43.60 |
| 522 | 32,284.36 | MC MERIT 3 (1.54%XSALES+$.10XITEMS) | 549.38 |
| 06 | 1,579.45 | MC KEY ENTERED (1.90%XSALES+$.10XITEMS) | 30.61 |
| 81 | 3,821.95 | MC CORP DATA RT1(2.65%XSALES+$.10XITEMS) | 109.38 |
| 16 | 604.03 | MC STANDARD DB (1.90%XSALES+$.25XITEMS) | 15.48 |
| 10 | 203.57 | MC KEY ENTER DB (1.64%XSALES+$.16XITEMS) | 4.94 |
| 929 | 37,417.09 | MC MERIT 3 DB (1.05%XSALES+$.15XITEMS) | 532.23 |
| 19- | 371.74- | MC CONS DB RF 3 @1.40% | 5.20- |
| 19- | 668.64- | MC CONS CR RF 4 @1.77% | 11.83- |

|  |  |  |  |
|---|---|---|---|
| 02- | 139.68- | MC CORP CR RF 3 @2.15% | 3.00- |
|  | 77,488.14 | MC DUES AND ASSESSMENTS(.095%XSALES) | 73.61 |
| 65 | 6,311.88 | VISA® BUS ELECT (2.20%XSALES+$.10XITEMS) | 145.36 |
| 05 | 206.18 | VISA® BUS STD (2.70%XSALES+$.10XITEMS) | 6.07 |
| 296 |  | DISCOVER AUTHORIZATIONS @ 15 CENTS | 44.40 |
|  |  | OTHER FEES DUE | 2,391.38 |

```
DISCOUNT DUE       334.23
OTHER FEES DUE     2,391.38
AMOUNT DEDUCTED    2,725.61
```

Legend

CARD PLAN CODES
----------------

| | | |
|---|---|---|
| VD - VISA® DEBIT CARD | VB - VISA® BUSINESS CARD | M - MASTERCARD® |
| MB - MASTERCARD® BUS. CARD | P1 - PRIVATE LABEL PLAN 1 | P2 - PRIVATE LABEL PLAN 2 |
| P3 - PRIVATE LABEL PLAN 3 | VA - VISA® CASH | MA - MASTERCARD® CASH |
| VL - VISA® LARGE TICKET | ML - MCS LARGE TICKET | DB - DEBIT CARD |
| JB - JCB | DC - DINERS CLUB CARD | DS - DISCOVER |
| AM - AMERICAN EXPRESS | V - VISA® | |

TRANSACTION PLAN CODES
----------------------

| | | |
|---|---|---|
| V - VISA® | M - MASTERCARD® | P - PRIVATE LABEL |
| L - LARGE TICKET | T - ALL PLANS | 1 - PLAN ONE |
| 2 - PLAN TWO | 3 - PLAN THREE | A - CASH ADVANCE |
| D - DEBIT | B - BUSINESS CARD | |

TRANSACTION TYPE CODES
----------------------

| | | |
|---|---|---|
| D - DEPOSIT | C - CHARGEBACK | A - ADJUSTMENT |
| B - CHARGEBACK REVERSAL | | |

At arrow 2-2, the data-entry entity stores the credit-card transaction data into intermediate storage 204 in the human-readable text format. The data stored in this example is human-readable text and likely differs from a format of some other merchant or client or is not an easily-machine-usable format. The tools proceed to arrow 2-3 to address this issue.

At arrow 2-3, formatting module 114 extracts the text-format credit-card transaction data for the thousands of merchants of the national bookstore chain using an Extract portion of an Extract, Transform, and Load (ETL) process. The tools execute a formatting ETL package 206, shown included in the formatting module of FIG. 2, to perform this ETL process. The formatting module differentiates between merchants of the national bookstore chain and other merchants based on merchant identifiers associated with the bookstore. These merchant identifiers are stored in table 208 in the relational database.

At arrow 2-4, the formatting module transforms the text-format credit card transaction data into an easily-machine-usable format for the thousands of merchants and using a Transform portion of the ETL process. This transformation is shown with arrow 2-4.

At arrow 2-5, the formatting module loads the credit-card transaction data in the easily-machine-usable format into the relational database. It loads the credit-card transaction data in this easily-machine-usable format for the thousands of merchants using a Load portion of the ETL process. For the one example merchant above, the formatting module stores its data into table 208 of the rational database. The formatting module also associates the merchant identifiers (here the "Merchant's Identification Number") in table 208 with the appropriate credit-card transaction data. The formatting module may also or instead associate the credit-card transaction data with internal database record numbers.

At this point in the process, credit-card transaction data is stored in the relational database in a format that is easily usable and consistent. By so doing, interchange module 116 may use the data to audit, track fee reductions, or otherwise use information about interchange categories for credit-card transactions. Examples of how the interchange module may do so are described below and include building a baseline card-issuer interchange rate and adjusting that rate, auditing card-issuer interchange fees, and tracking reductions in those fees. Category module 120 may use the data to determine potential fee savings if the interchange categories assigned are replaced by lower-cost interchange categories.

Examples of how the category module may act are described after the following section and also include analyzing categories and their parameters to determine ways in which to alter which category will be assigned in the future to similar transactions. Similar transactions are those transactions that would be assigned the same interchange category were a parameter change not made. Thus, a current transaction where a card was swiped but no signature is received is similar to a future transaction where a card is swiped and a signature is received, so long as if the future transaction did not have a signature it would have been assigned the same category. The parameter change here is addition of the signature.

Building and Adjusting Baseline Interchange Rates

This section continues the above example in the context of credit-card transaction data being made available to interchange module 116 to build and adjust a baseline interchange rate for the above-described national bookstore chain. In later sections the transaction data made available to the interchange module will be used for other purposes, such as monthly auditing or determining actual or potential savings.

In this section the tools start by building, automatically and without user interaction, a baseline interchange rate for the bookstore client based on a twelve-month history of credit-card transaction data for the bookstore's 2,000 merchants. The interchange module is enabled to extract this historical data by the tools performing the actions of FIG. 2 twelve times for each of the 2,000 merchants, i.e., for 24,000 merchant-processor statements.

The credit-card transaction data received is in an easily-machine-usable form and includes card-issuer interchange fees, card-issuer interchange categories assigned, dollar volumes, and numbers of transactions to which card-issuer interchange categories are assigned by a merchant processor. This data is for each merchant and for each billing cycle of the historic period, i.e., twelve historic merchant-processor statements of each particular merchant for all of the bookstore's merchants over the historical twelve-month period.

Figure 3:
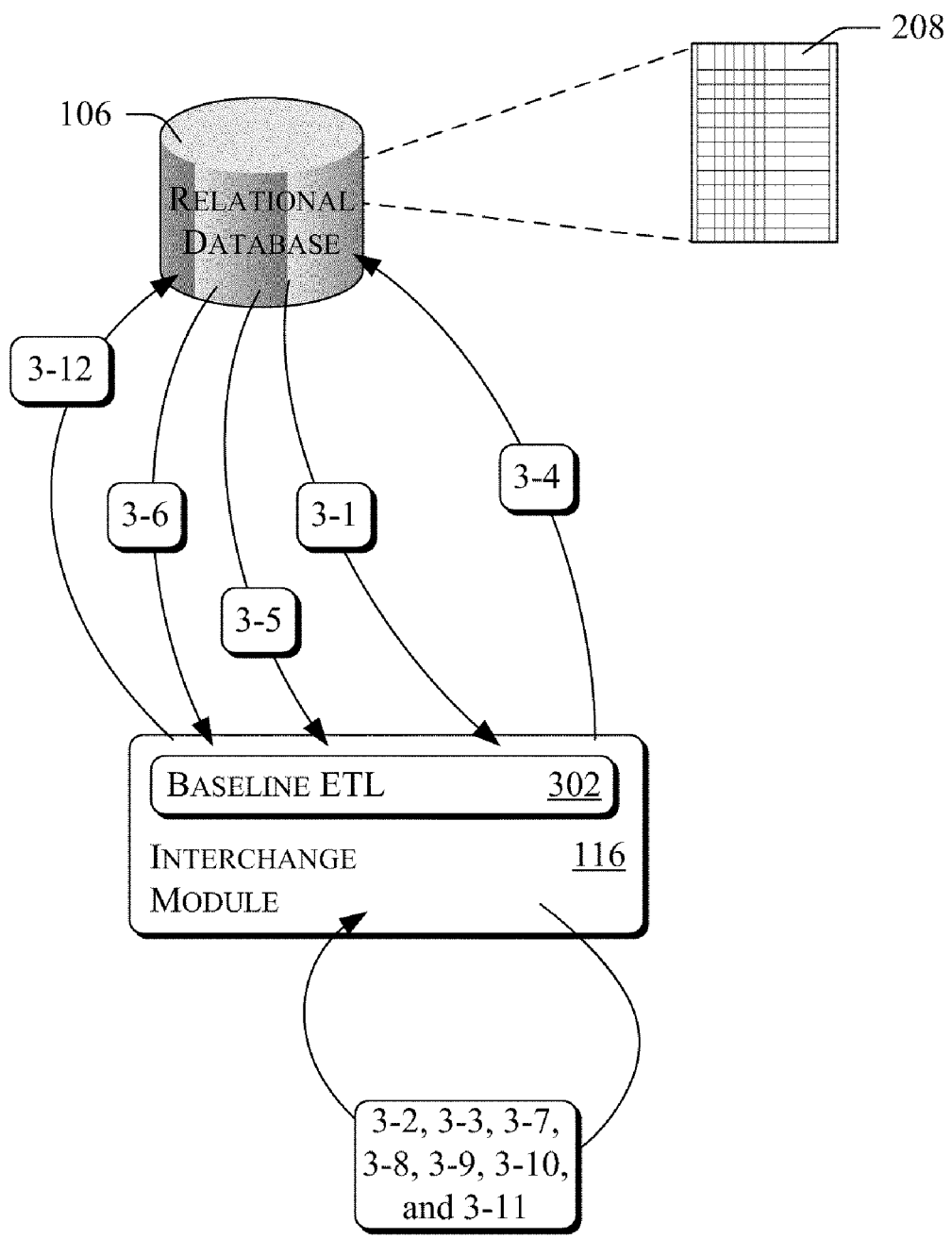
FIG. 3 illustrates an example flow diagram in which the tools build and adjust a baseline interchange rate.

Specifically, at arrow 3-1 in FIG. 3, interchange module 116 extracts card-issuer interchange fees and dollar volumes on which the fees were assessed for all of the bookstore's 2,000 merchants over the last twelve billing cycles. The interchange module uses each merchant's identifier (e.g., "932734932") and each billing cycle's end date (e.g., May 31, 2005) to find this information in relational database 106 (e.g., portions of table 208 for one merchant at one billing cycle).

At arrow 3-2, the interchange module adds up all the fees and dollar volumes for each merchant over the twelve-month period. The interchange module then does this again and again for every merchant and then adds these together. By so doing, the interchange module determines the client's total fees and dollar volume on which the fees were based.

At arrow 3-3, the interchange module divides the total fees by this dollar volume to provide a baseline card-issuer interchange rate for the historical twelve-month period for the bookstore.

At arrow 3-4, the interchange module loads the baseline card-issuer interchange rate into relational database 106. The interchange module performs the actions of arrows 3-1 to 3-4 using baseline ETL package 302, shown included in interchange module 116 in FIG. 3.

After building the baseline, the tools proceed to adjust the baseline in the following example manner.

At arrow 3-5, the interchange module determines the dollar volume on which each card-issuer interchange category was assigned for all credit-card transactions for all of the bookstore's 2,000 merchants during the historic period. The categories assigned may be tracked as part of arrows 3-1 to 3-3 or separately, as is done here. Here the interchange module extracts, from the historic credit-card transaction data for the bookstore's merchants, the interchange categories assigned, the dollar volumes, and the number of transactions for each of the interchange categories.

Consider a portion of the example merchant-processor statement provided above:

| FEES NUMBER | AMOUNT | DESCRIPTION | TOTAL |
|---|---|---|---|
| | | SUPPORT PACKAGE | 5.95 |
| 02 | 14.00 | TERMINAL FEE | 28.00 |
| 10 | 586.95 | VISA ® STANDARD (2.63% XSALES + $.10XITEMS) | 16.44 |
| 350 | 12,452.24 | VISA ® RTL CK DB (1.05% XSALES + $.15XITEMS) | 183.25 |
| 461 | 27,404.65 | VISA ® CPS RETAIL (1.54% XSALES + $.10XITEMS) | 468.13 |
| 57 | 3,431.71 | VISA ® EIRF (2.14% XSALES + $.10XITEMS) | 79.14 |
| 16- | 662.12- | VISA ® CREDIT CONSUMER CARD @ 1.67% | 11.06- |
| 01- | 6.37- | VISA ® CREDIT COMMERCIAL CARD @ 2.24% | .14- |
| 47 | 1,716.92 | VISA ® EIRF DB (1.75% XSALES + $.20XITEMS) | 39.45 |
| 02 | 92.90 | VISA ® STANDARD DB(1.90% XSALES + $.25XITEMS) | 2.27 |
| 09- | 257.19- | VISA ® CV-CNSR DB (1.31% XSALES) | 3.37- |
| | 52,203.43 | VISA ® DUES AND ASSESSMENTS (.0925% XSALES) | 48.29 |
| 10 | 1,577.69 | MC STANDARD (2.70% XSALES + $.10XITEMS) | 43.60 |
| 522 | 32,284.36 | MC MERIT 3 (1.54% XSALES + $.10XITEMS) | 549.38 |
| 06 | 1,579.45 | MC KEY ENTERED (1.90% XSALES + $.10XITEMS) | 30.61 |
| 81 | 3,821.95 | MC CORP DATA RT1(2.65% XSALES + $.10XITEMS) | 109.38 |
| 16 | 604.03 | MC STANDARD DB (1.90% XSALES + $.25XITEMS) | 15.48 |
| 10 | 203.57 | MC KEY ENTER DB (1.64% XSALES + $.16XITEMS) | 4.94 |
| 929 | 37,417.09 | MC MERIT 3 DB (1.05% XSALES + $.15XITEMS) | 532.23 |
| 19- | 371.74- | MC CONS DB RF 3 @1.40% | 5.20- |
| 19- | 668.64- | MC CONS CR RF 4 @1.77% | 11.83- |
| 02- | 139.68- | MC CORP CR RF 3 @2.15% | 3.00- |
| | 77,488.14 | MC DUES AND ASSESSMENTS(.095% XSALES) | 73.61 |
| 65 | 6,311.88 | VISA ® BUS ELECT (2.20% XSALES + $.10XITEMS) | 145.36 |
| 05 | 206.18 | VISA ® BUS STD (2.70% XSALES + $.10XITEMS) | 6.07 |
| 296 | | DISCOVER AUTHORIZATIONS @ 15 CENTS | 44.40 |
| | | OTHER FEES DUE | 2,391.38 |

In this case the interchange module determines that 461 credit-card transactions totaling $27,404.65 were assigned a "VISA® CPS RETAIL" card-issuer interchange category for one merchant for one billing cycle. The interchange module does this over and over for each category and each merchant and each billing cycle in the historic period. Assume, for example, that the interchange module determines that 800,000 transactions totaling $50,000,000 were assigned a "VISA® CPS RETAIL" category for the bookstore during the twelve-month history.

At arrow 3-6, the interchange module receives current card-issuer interchange rates for each of the categories assigned to a credit-card transaction. The module receives this by extracting it from the relational database into which it was stored by data-entry entity 104 either automatically or by manual user entry.

At arrow 3-7, the interchange module determines if any of the assigned category's rates have changed. Assume that the "VISA® CPS RETAIL" rate, which during the historic period was 1.54% of each sale plus $0.10 per sale, is now 1.55% of each sale plus $0.11 per sale. For simplicity, assume for this portion of the example that no other category's rate has changed since or during the twelve-month historical period (which is unlikely). The interchange module determines that the "VISA® CPS RETAIL" rate changed based on its old rate (which was found in the credit-card transaction data in the merchant-processor statement but could be found in other ways) compared to the new rate.

At arrow 3-8, the interchange module determines the rate change—here 0.01% of each sale and $0.01 per sale.

At arrow 3-9, the interchange module determines a fee difference over the historical period sufficient to reflect the rate change. This rate change reflects what the baseline rate would have been had the new rate been charged throughout the historic period. The interchange module multiplies the rate change by the dollar volume and number of transactions.

The "VISA® CPS RETAIL" category had 800,000 transactions totaling $50,000,000, so the fee difference is:

Fee difference=0.0001×$50,000,000+$0.01×800,000=$13,000

At arrow 3-10, the interchange module adds this fee to the total fee for all credit-card transactions for the bookstore during the historical period. Here assume the total fee was $15,000,000. Thus, the adjusted fee over the baseline historical period would be $15,013,000.

At arrow 3-11, the interchange module divides the adjusted fee of $15,013,000 by the total dollar volume for the bookstore over the historical period (e.g., $750,000,000). This provides an adjusted baseline card-issuer interchange rate. If the fee based on the adjusted rate was $15,000,000 divided by $750,000,000, and thus 2.00%, the adjusted baseline rate is 2.00173333%.

At arrow 3-12, the interchange module stores the adjusted baseline rate in relational database 106 of FIG. 3. The interchange module may perform the actions of arrows 3-5 to 3-11 using a Transform portion of an ETL process by executing baseline ETL package 302 and arrow 3-12 using a Load portion of this ETL process.

Determining Ways in which to Alter Interchange Categories

This section continues the above example in the context of determining ways in which to alter an interchange category assigned, such as the interchange category assigned in a prior merchant-processor statement for the example bookstore. Current or historic statements may be audited and analyzed, though this particular example focuses on a historic statement to describe an example way in which the tools analyze interchange categories to reduce interchange category fees charged now and in future statements.

For this portion of the ongoing example, assume that some of the bookstore's merchants have different areas of business. Assume that one merchant is a merchant through which a university bookstore receives and records transactions for textbook sales either in person or over the phone. This university merchant, even though associated with the national bookstore chain, qualifies as operating in an educational area of business, which affects the interchange categories that may be assigned to its transactions.

Prior to analyzing credit-card transaction data, however, the tools act to learn about interchange categories and their parameters. One example way in which the tools may do so is described below using category entity 122 and category module 120.

Figure 4:
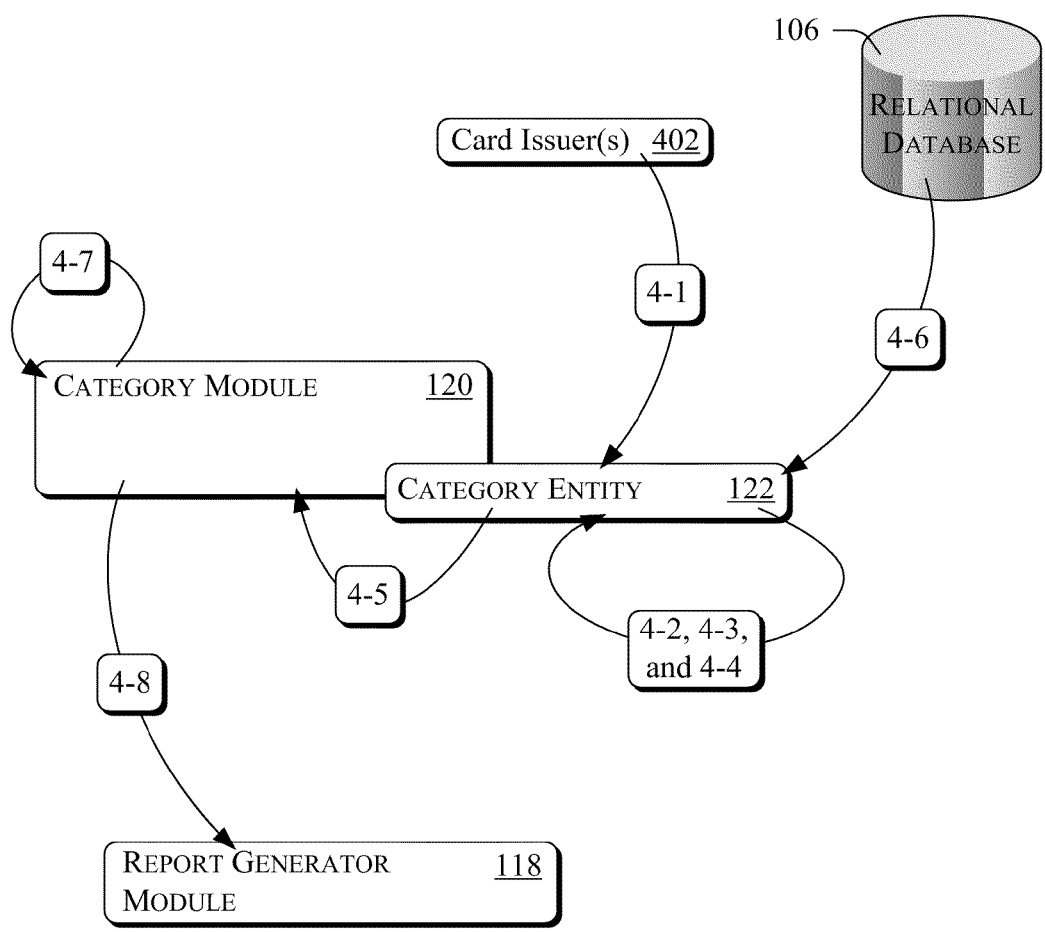
FIG. 4 illustrates an example flow diagram in which the tools determine ways in which to alter interchange categories assigned to transactions of a merchant operating in a university bookstore and the accompanying potential fee savings.

At arrow 4-1 in FIG. 4, category entity 122 receives interchange categories currently being assigned by card issuers and parameters used to determine which transactions should be assigned which interchange category. These are received from card issuer(s) 402 directly or indirectly (e.g., from their website(s) over the Internet or some other source). As noted above, interchange categories often have parameters, some as many as four, e.g., a merchant's-area-of-business parameter, information-received-for-a-transaction parameters, how-information-was-received-for-the-transaction parameters, and a type-of-card-used parameter. Some categories have no or few parameters—these are catch-all categories, which often have very poor rates (i.e., high fees).

The following interchange categories, along with their parameters, are currently used by VISA® and MasterCard® (and their member banks):

|  | Interchange Rate | Card Type | Primary Qualification Criteria<br>Primary qualification criteria applies to the card products listed in the Card Type column unless otherwise indicated |
|---|---|---|---|
| VISA ® Interchange Categories |  |  |  |
| CPS Retail-Credit | 1.54% + $0.10 | Consumer Credit | 1. Swipe card, obtain customer's signature |
| CPS Retail-Debit | 1.03% + $0.15 | Non-PIN Debit | 2. Authorize and settle within 1 day |
| CPS Rewards 1 | 1.65% + $0.10 | Rewards | 3. Obtain and pass 1 valid electronic authorization |
|  |  |  | 4. When processing a Non-PIN debit transaction the authorization and settlement amount must match. MCC's 4121 (taxicab & limousines, 5813 (Bars & Taverns), 7230 (Beauty & Barber Shops), 7298 (Health & Beauty Spas) are allowed to settle within 20% of the authorized amount. |
| (Custom Payment Service) |  |  | 5. Bill payment transactions that do not have health or select developing market MCC's must send a Market Specific Indicator (MSI) of "B", ACI of "Y" processing code of "50" and MO/TO indicator of "01" for one time payment, "02" for recurring payment and "03" for installment payment . AVS is not required for bill payment transactions |
| CPS Restaurant-Credit | 1.54% + $0.10 | Consumer Credit | 1. Available to Restaurants (MCC 5812) and Fast Food Restaurants (MCC 5814) |
| CPS Restaurant-Debit | 1.19% + $0.10 | Non-PIN Debit | 2. Swipe card, obtain customer's signature; If transaction is under $25 no signature required |
| CPS Rewards 2 | 1.90% + $0.10 | Rewards | 3. Obtain and pass 1 valid electronic authorization |
|  |  |  | 4. Authorize and settle within 1 day |
| CPS Service Station-Credit | 1.43% + $0.10 | Consumer Credit | 1. Available to Service Stations (MCC 5541) |
| CPS Service Station-Debit | 0.70% + $0.17 | Non-PIN Debit | 2. Swipe card, obtain customer's signature; If transaction is under $25 no signature required |
| CPS Rewards 1 | 1.65% + $0.10 | Rewards | 3. Obtain and pass 1 valid electronic authorization |
|  |  |  | 4. Authorize and settle within 1 day |
| CPS Automated Fuel Dispenser-Credit | 1.50% + $0.05 | Consumer Credit | 1. Available to Automated Fuel Dispenser (MCC 5542) |
| CPS Automated Fuel Dispenser-Debit | 0.70% + $0.17 | Non-PIN Debit | 2. AFD swipe card on a Card Activated Terminal (CAT) |
| CPS Rewards 1 | 1.65% + $0.10 | Rewards | 3. Must pass CAT level indicator of a "3" |
|  |  |  | 4. Obtain and pass 1 valid electronic authorization ($1.00 status check)<br>5. $75.00 transaction limit<br>6. Authorize and settle within 1 day |
| CPS Supermarket-Credit | 1.24% + $0.05 | Consumer Credit | 1. Available to Supermarkets (MCC 5411) |

-continued

| | Interchange Rate | Card Type | Primary Qualification Criteria<br>Primary qualification criteria applies to the card products listed in the Card Type column unless otherwise indicated |
|---|---|---|---|
| CPS Supermarket-Debit | 1.03% + $0.15 ($0.35 cap) | Non-PIN Debit | 2. Swipe Card, obtain customer's signature |
| CPS Rewards 1 | 1.65% + $0.10 | Rewards | 3. Obtain and pass 1 valid electronic authorization |
| | | | 4. Authorize and settle within 1 day<br>5. When accepting Non-PIN Debit transactions the authorization amount and settlement amount must match;<br>6. To qualify for Supermarket debit must be a U.S issued Non-PIN Debit card |
| CPS Retail Key-Entered-Credit | 1.85% + $0.10 | Consumer Credit | 1. Magnetic stripe not readable, key-enter transaction, obtain customer's signature |
| CPS Retail Key-Entered-Debit | 1.60% + $0.15 | Non-PIN Debit | 2. Authorize and settle within 1 day |
| CPS Rewards 2 | 1.90% + $0.10 | Rewards | 3. Obtain and pass 1 valid electronic authorization |
| | | | 4. AVS required, Use Address Verification (AVS) feature on terminal or software; zip code must match; and a POS indicator of "71". If processing bill payment transactions that do not have health or select developing market MCC's must send a Market Specific Indicator (MSI) of "B", ACI of "Y", processing code of "50" and MO/TO indicator of "01" for one time payment , "02" for recurring payment and "03" for installment payment. AVS is required for bill payment transactions |
| CPS Small Ticket-Credit | 1.65% + $0.04 | Consumer Credit/Rewards | 1. Available to Restaurants (MCC 5812) and Fast Food Restaurants (MCC 5814)Local Commuter Transport (MCC 4111), Taxi/Limo Service (MCC 4121), Parking Lots (MCC 7523), Video Rental (MCC 7841), Movie Theater (MCC 7832), Bus Lines (MCC 4131), Toll & Bridge Fees (MCC 4784), News Dealers & Newsstands (MCC 5994), Laundries (MCC 7211), Dry Cleaners (7216), Quick Copy (MCC 7338), Car Washes (7542) |
| CPS Small Ticket-Debit | 1.55% + $0.04 | Non-PIN Debit | 2. Swipe card, customer's signature not required; merchants processing with a Card Activated Terminal (CAT) not eligible<br>3. Obtain and pass 1 valid electronic authorization<br>4. Authorize and settle within 1 day<br>5. Transaction amount less than or equal to $15.00<br>Restaurants and Fast Food restaurants that take Signature and Infinite cards are eligible for CPS Small Ticket when clearing requirements are met |
| CPS Retail 2 (Emerging Mkt)-Credit | 1.43% + $0.05 | Consumer Credit/Rewards | 1. Available to Government (MCC 9399, 9211, 9222), Schools (MCC 8220, 8211, 8299), Utilities (MCC 4899) Insurance Companies (MCC 6300, 5960), Fuel Dealers (MCC 5983), Child Care Services (MCC 8351), Charitable Organizations (MCC 8398), and Direct Marketing Subscription Merchants (MCC 5968). MCCs 5960 and 5968 requires CPS/CNP or CPS/Ecommerce qualification |
| CPS Retail 2 (Emerging Mkt)-Debit | 0.80% + $0.25 | Non-PIN Debit | 2. Swipe or key-enter transaction, obtain customer's signature when transaction is face-to-face |
| | | | 3. Obtain and pass 1 valid electronic authorization<br>4. Must be CPS qualified<br>5. Bill payment transactions that do not have health or select developing market MCC's must send a Market Specific Indicator (MSI) of "B", ACI of "Y" processing code of "50" and MO/TO indicator of "01" for one time payment, "02" for recurring payment and "03" for installment payment. AVS is not required for bill payment transactions<br>6. Authorize and create a sale within 1 day and settle within 2 days |
| CPS Utility Program-Credit | $0.75 | Consumer Credit/Rewards | 1. Available to utility merchants with MCC 4900 (water, gas, electrical, sanitation) |
| CPS Utility Program-Debit | $0.75 | Non-PIN Debit | 2. Must be registered with visa ® with valid MVV on account |

-continued

| | Interchange Rate | Card Type | Primary Qualification Criteria<br>Primary qualification criteria applies to the card products listed in the Card Type column unless otherwise indicated |
|---|---|---|---|
| | | | 3. Obtain and pass 1 valid electronic authorization<br>4. Authorize and create a sale with 1 day and settle within 2 days<br>5. Must be CPS qualified; If not a bill payment transaction must submit a ACI of "R" to bypass AVS |
| CPS Car Rental Card Present-Credit | 1.58% + $0.10 | Consumer Credit | 1. Available to Car Rental merchants |
| CPS Car Rental Card Present-Debit | 1.36% + $0.15 | Non-PIN Debit | 2. Swipe Card, obtain customer's signature |
| CPS Rewards 2 | 1.90% + $0.10 | Rewards | 3. 1 or more electronic authorization, with original auth at settlement, 1 authorization reversal Transaction must include: Rental Agreement#, Check-Out/Return Date, Duration, No Show/Extra Charge indicator<br>4. 1 day to settle between the check out/Return Date and the settlement date<br>5. Can settle within 15% of the authorized amount; includes authorization reversal and incrementals |
| CPS Car Rental Card Not Present-Credit | 1.58% + $0.10 | Consumer Credit | 1. Available to Car Rental merchants |
| CPS Car Rental Card Not Present-Debit | 1.36% + $0.15 | Non-PIN Debit | 2. Key-entered transaction |
| CPS Rewards 2 | 1.90% + $0.10 | Rewards | 3. 1 or more electronic authorization, with original auth at settlement, 1 authorization reversal Transaction must include: Rental Agreement#, Check-Out/Return Date, Duration, No Show/Extra Charge indicator, Preferred Customer indicator (P).<br>4. 1 day to settle between the Check Out/Return Date and the settlement date<br>5. Can settle within 15% of the authorized amount; includes authorization reversal and incrementals |
| CPS Hotel Card Present-Credit | 1.58% + $0.10 | Consumer Credit | 1. Available to Lodging |
| CPS Hotel Card Present-Debit | 1.36% + $0.15 | Non-PIN Debit | 2. Swipe Card, obtain customer's signature |
| CPS Rewards 2 | 1.90% + $0.10 | Rewards | 3. 1 or more electronic authorization, with original auth at settlement, 1 authorization reversal Transaction must include: Folio #, Check-In Date, Duration, No Show/Extra Charge indicator<br>4. 1 day to settle between the check out and the settlement date<br>5. Can settle within 15% of the authorized amount; includes authorization reversal and incrementals |
| CPS Hotel Card Not Present-Credit | 1.58% + $0.10 | Consumer Credit | 1. Available to Lodging |
| CPS Hotel Card Not Present-Debit | 1.36% + $0.15 | Non-PIN Debit | 2. Key-entered transaction |
| CPS Rewards 2 | 1.90% + $0.10 | Rewards | 3. 1 or more electronic authorization, with original auth at settlement, 1 authorization reversal Transaction must include: Folio #, Check-In Date, Duration, No Show/Extra Charge indicator, Preferred Customer indicator (P).<br>4. 1 day to settle between the check out and the settlement date<br>5. Can settle within 15% of the authorized amount; includes authorization reversal and incrementals |
| CPS Car Rental E-Commerce-Credit | 1.58% + $0.10 | Consumer Credit | 1. Available to Car Rental merchants |
| CPS Car Rental E-Commerce-Debit | 1.36% + $0.15 | Non-PIN Debit | 2. Key-entered transaction |

| | Interchange Rate | Card Type | Primary Qualification Criteria<br>Primary qualification criteria applies to the card products listed in the Card Type column unless otherwise indicated |
|---|---|---|---|
| CPS Rewards 2 | 1.90% + $0.10 | Rewards | 3. 1 or more electronic authorization, with original auth at settlement, 1 authorization reversal Transaction must include: Rental Agreement#, Check-Out/Return Date, Duration, No Show/Extra Charge indicator, Preferred Customer indicator (P).<br>4. 1 day to settle between the check out and the settlement date<br>5. Can settle within 15% of the authorized amount; includes authorization reversal and incrementals<br>6. E-Commerce transactions must perform Cardholder Authentication Verification Value (CAVV) and include an e-commerce indicator of a 5 or 6 |
| CPS Hotel E-Commerce-Credit | 1.58% + $0.10 | Consumer Credit | 1. Available to Lodging merchants |
| CPS Hotel E-Commerce-Debit | 1.36% + $0.15 | Non-PIN Debit | 2. Key-entered transaction |
| CPS Rewards 2 | 1.90% + $0.10 | Rewards | 3. 1 or more electronic authorization, with original auth at settlement, 1 authorization reversal Transaction must include: Folio #, Check-In Date, Duration, No Show/Extra Charge indicator, Preferred Customer indicator (P).<br>4. 1 day to settle between the check out and the settlement date<br>5. Can settle within 15% of the authorized amount; includes authorization reversal and incrementals<br>6. E-Commerce transactions must perform Cardholder Authentication Verification Value (CAVV) and include an e-commerce indicator of a 5 or 6 |
| CPS Card Not Present-Credit | 1.85% + $0.10 | Consumer Credit | 1. Key-enter transaction; If prompted "is card present" answer No |
| CPS Card Not Present-Debit | 1.60% + $0.15 | Non-PIN Debit | 2. Obtain and pass 1 valid electronic authorization, 1 authorization reversal allowed |
| CPS Rewards 2 | 1.90% + $0.10 | Rewards | 3. Settle within 1 day (1 day to settle between ship date and settlement date)<br>4. AVS required-use AVS feature on terminal or software: enter up to first 5 numeric characters of address then zip code<br>5. Transaction date must equal shipping date and that date is no more than 7 days after authorization,<br>6. Authorization and settlement amount must match<br>7. Transaction must include; order number, customer service phone number and MO/TO indicator of a "01" and a POS indicator of "08"<br>8. Bill payment transactions that do not have health or select developing market MCC's must send a Market Specific Indicator (MSI) of "B", ACI of "Y", processing code of "50" and MO/TO indicator of "01" for one time payment, "02" for recurring payment and "03" for installment payment. AVS is not required for bill payment transactions |
| CPS E-Commerce Basic-Credit | 1.85% + $0.10 | Consumer Credit | 1. Available to E-Commerce merchants; Key-enter transaction |
| CPS E-Commerce Basic-Debit | 1.60% + $0.15 | Non-PIN Debit | 2. Obtain and pass 1 valid electronic authorization, 1 authorization reversal allowed |
| CPS Rewards 2 | 1.90% + $0.10 | Rewards | 3. Settle within 1 day (1 day to settle between ship date and settlement date)<br>4. AVS required-use AVS feature on terminal or software: enter up to first 5 numeric characters of address then zip code<br>5. Transaction date must equal shipping date and that date is no more than 7 days after authorization<br>6. Authorization and settlement amount must match<br>7. Transaction must include; order number, customer service phone number<br>8. E-Commerce indicator of a "7" must be present; and a POS indicator of "59". and Bill payment transactions that do not have health or select developing market MCC's must send a Market Specific Indicator (MSI) of "B", ACI of "Y", processing code of "50" and MO/TO indicator of "5", "6", or "7". AVS is required for bill payment transactions |

-continued

| | Interchange Rate | Card Type | Primary Qualification Criteria<br>Primary qualification criteria applies to the card products listed in the Card Type column unless otherwise indicated |
|---|---|---|---|
| CPS E-Commerce Preferred-Credit | 1.80% + $0.10 | Consumer Credit/Rewards | 1. Available to E-Commerce merchants for key entered transactions |
| CPS E-Commerce Preferred-Debit | 1.55% + $0.15 | Non-PIN Debit | 2. Obtain and pass 1 valid electronic authorization, 1 authorization reversal allowed |
| | | | 3. Settle within 1 day (1 day to settle between ship date and settlement date)<br>4. Transaction date must equal shipping date and that date is no more than 7 days after authorization<br>5. Authorization and settlement amount must match<br>6. Transaction must include; order number, customer service phone number<br>7. Must have secured E-Commerce indicator of "5" or "6" must be present and a POS condition code of "59" Must perform Cardholder Authentication Verification Value (CAVV). For bill payment transactions that do not have health or select developing market MCC's must send a Market Specific Indicator (MSI) of "B", ACI of "Y", processing code of "50" and MO/TO indicator of "5", "6", or "7". AVS is required for bill payment transactions |
| CPS Passenger Transport-Credit | 1.75% + $0.10 | Consumer Credit | 1. Available to Airlines & Railways |
| CPS Passenger Transport-Debit | 1.60% + $0.15 | Non-PIN Debit | 2. Swipe or key-enter transaction, obtain customer's signature when the transaction is face-to-face |
| CPS Rewards 2 | 1.90% + $0.10 | Rewards | 3. Obtain and pass 1 valid electronic authorization |
| | | | 4. Settle within 7 days<br>5. Transaction must include; ticket number, sequence number, count and itinerary information<br>6. Transaction date must equal authorization date. |
| CPS E-Commerce Passenger Transport Preferred-Credit | 1.75% + $0.10 | Consumer Credit | 1. Available to Airlines & Railways |
| CPS E-Commerce Passenger Transport Preferred-Debit | 1.60% + $0.15 | Non-PIN Debit | 2. Key-enter transaction |
| CPS Rewards 2 | 1.90% + $0.10 | Rewards | 3. Obtain and pass 1 valid electronic authorization |
| | | | 4. Settle within 7 days<br>5. Transaction must include; ticket number, sequence number, count and itinerary information<br>6. E-Commerce transactions must include E-Commerce indicator of "5" or "6". Must perform Cardholder Authentication Verification Value (CAVV)<br>7. Transaction date must equal authorization date. |
| Signature Card Electronic | 2.30% + $0.10 | Signature | 1. Applies to T&E merchants |
| | | | 2. Swipe card, obtain customer's signature when transaction is face-to-face<br>3. Obtain and pass 1 valid electronic authorization<br>4. Authorize and settle within 1 day<br>5. Must be CPS qualified |
| Signature Card Standard | 2.70% + $0.10 | Signature | 1. Applies to T&E merchants; Swipe card or key-enter transaction, obtain customer's signature when transaction is face-to-face<br>2. Electronic authorization not required<br>3. Settle within 29 days |
| EIRF-Credit | 2.30% + $0.10 | Consumer Credit/Rewards | 1. Swipe or key-enter transaction, Get signature when the transaction is face-to-face |

-continued

| | Interchange Rate | Card Type | Primary Qualification Criteria<br>Primary qualification criteria applies to the card products listed in the Card Type column unless otherwise indicated |
|---|---|---|---|
| EIRF-Debit | 1.75% + $0.20 | Non-PIN Debit | 2. Obtain and pass 1 valid electronic authorization<br>Authorize sale through terminal/software or telephone<br>3. Authorize and create a sale with 1 day and settle within 2 days |
| Consumer Standard-Credit | 2.70% + $0.10 | Consumer Credit/Rewards | 1. Swipe or key-enter transaction, obtain customer's signature when the transaction is face-to-face |
| Consumer Standard-Debit | 1.90% + $0.25 | Non-PIN Debit | 2. Electronic authorization not required<br>3. Settle within 29 days<br>Only level available for high-risk merchants and non-secure E-commerce transactions |
| International Airline | 1.10% | Consumer Credit-Non US Issued | 1. Available to merchants with airline MCC 3000-3299 or 4511<br>2. Swipe or key-enter transaction, Get signature when the transaction is face-to-face<br>3. Must be CPS qualified |
| Interregional Signature Airline | 1.80% | Signature-Non US Issued | 1. Available to merchants with airline MCC 3000-3299 or 4511<br>2. Swipe or key-enter transaction, Get signature when the transaction is face-to-face<br>3. Must be CPS qualified |
| Foreign Electronic | 1.10% | Consumer Credit | 1. Swipe card, obtain customer's signature when the transaction is face-to-face<br>2. Obtain and pass 1 valid electronic authorization<br>3. Settle within 2 days<br>4. Applies to Non-US merchants and US territory merchant locations |
| Foreign Standard | 1.60% | Consumer Credit | 1. Swipe or key-enter transaction, obtain customer's signature when the transaction is face-to-face<br>2. Electronic authorization not required<br>3. Settle within 29 days<br>4. Applies to Non-US merchants and US territory merchant locations |
| GSA Purchasing Card Large Ticket | 0.95% + $35.00 | GSA Purchasing Card | 1. Swipe or key-enter transaction, obtain customer's signature when the transaction is face-to-face<br>2. Obtain and pass 1 valid electronic authorization<br>3. Non-T&E merchant<br>4. Transaction must be equal to or greater than $5,000 and less than $8750.<br>5. Pass Level II and Level III Data<br>6. Must be CPS qualified |
| GSA Purchasing Card Large Ticket I | 1.35% | GSA Purchasing Card | 1. Swipe or key-enter transaction, obtain customer's signature when the transaction is face-to-face<br>2. Obtain and pass 1 valid electronic authorization<br>3. Non-T&E merchant<br>4. Transaction amount equal to or greater than $8750.<br>5. Pass Level II and Level III Data<br>6. Must be CPS qualified |
| Purchasing Card Large Ticket | 0.95% + $35.00 | Purchasing Card-Non GSA | 1. Available to Non-T&E merchants<br>2. Must register with Visa<br>3. $1000 registration fee<br>4. Must have MVV (merchant verification value) on account<br>5. Swipe or key-enter transaction, obtain customer's signature when transaction is face-to-face<br>6. Obtain and pass 1 valid electronic authorization<br>7. Settle within 7 days<br>8. Transaction greater than or equal to $4,653.33; Pass Level II and Level III Data<br>9. Must Pass Level II and Level III Data<br>10. Must be CPS qualified |
| Commercial Card Level III | 1.80% + $0.10 | Purchasing Card-Non GSA | 1. Swipe or key-enter transaction, obtain customer's signature when the transaction is face-to-face |

-continued

| Interchange Rate | Card Type | Primary Qualification Criteria<br>Primary qualification criteria applies to the card products listed in the Card Type column unless otherwise indicated |
|---|---|---|
| | | 2. Obtain and pass 1 valid electronic authorization<br>3. Non-T&E merchant<br>4. Must be CPS qualified<br>5. Must pass Level III Data |
| Commercial Card Level II-Corporate | 2.00% + $0.10 | Corporate | 1. Swipe or key-enter transaction, obtain customer's signature when the transaction is face-to-face |
| Commercial Card Level II-Business | 2.00% + $0.10 | Business | 2. Obtain and pass 1 valid electronic authorization |
| Commercial Card Level II-Purchase | 2.00% + $0.10 | Purchasing | 3. Non-T&E merchant |
| | | | 4. Must be CPS qualified; AVS required for Business cards<br>5. Must pass Level II Data<br>6. Customer Code required for Purchasing Card transactions from fuel MCCs: 4468, 5499, 5541, 5542, and 5983 |
| Commercial Card Electronic-Corporate | 2.20% + $0.10 | Corporate | 1. Swipe or key-enter transaction, obtain customer's signature when the transaction is face-to-face |
| Commercial Card Electronic-Business | 2.40% + $0.10 | Business | 2. CPS requirements are not met |
| Commercial Card Electronic-Purchase | 2.45% + $0.10 | Purchasing | 3. Must pass Level II Data |
| | | | Best Commercial Card level for Touch-Tone merchants |
| Commercial Card Electronic T&E-Corporate | 2.20% + $0.10 | Corporate | 1. Swipe or key-enter transaction, obtain customer's signature when the transaction is face-to-face |
| Commercial Card Electronic T&E-Business | 2.40% + $0.10 | Business | 2. Obtain and pass 1 valid electronic authorization |
| Commercial Card Electronic T&E-Purchase | 2.45% + $0.10 | Purchasing | 3. T&E transactions must be CPS qualified |
| | | | Best Commercial Card level for T&E |
| Purchasing Card Electronic with Data | 2.45% + $0.10 | Purchasing Card-Non GSA | 1. CPS requirements are not met |
| | | | 2. Must pass Level III Data |
| Purchasing Card-Retail | 2.20% + $0.10 | Purchasing Card-GSA and Non-GSA Fleet | 1. CPS requirements are not met . . . GSA and Non-GSA Fleet Purchasing card fuel transactions that meet Level II and fuel data requirements<br>2. CPS qualified . . . GSA and Non-GSA Fleet Purchasing card fuel transactions that do not meet Level 2 and fuel data requirements |
| Corporate-Card Not Present | 2.20% + $0.10 | Corporate/Signature Preferred | 1. Must be CPS qualified for CPS/Card Not Present, CPS/Electronic Commerce Basic or Preferred, CPS/Retail 2, or CPS/Account Funding |
| Business-Card Not Present | 2.25% + $0.10 | Business | 2. Level II data requirements are not met including tax-exempt transactions |
| Purchasing-Card Not Present | 2.40% + $0.10 | Purchasing | 3. Must be a Non-Travel Service MCC |
| Corporate-Retail | 2.20% + $0.10 | Corporate/Signature Preferred | 1. Must be CPS qualified for CPS/Retail, CPS/Supermarket, CPS/Retail Key Entry, CPS/Small Ticket, CPS/Automated Fuel Dispenser, or CPS/Retail Service Station |
| Business-Retail | 2.20% + $0.10 | Business | 2. Level II data requirements are not met including tax-exempt transactions |
| Purchasing-Retail | 2.20% + $0.10 | Purchasing | 3. Must be a Non-Travel Service MCC |

-continued

| | Interchange Rate | Card Type | Primary Qualification Criteria<br>Primary qualification criteria applies to the card products listed in the Card Type column unless otherwise indicated |
|---|---|---|---|
| Corporate-Business-to-Business | 2.10% + $0.10 | Corporate/Signature Preferred | 1. Must be CPS qualified |
| Business-Business-to-Business | 2.10% + $0.10 | Business | 2. Level II data requirements are not met including tax-exempt transactions |
| Purchasing-Business-to-Business | 2.10% + $0.10 | Purchasing | 3. Limited to business-to-business MCCs |
| Commercial Card Standard-Corporate | 2.70% + $0.10 | Corporate/Signature Preferred | 1. Swipe or key-enter transaction, Get signature when the transaction is face-to-face |
| Commercial Card Standard-Business | 2.70% + $0.10 | Business | 2. Electronic authorization not required |
| Commercial Card Standard-Purchase | 2.70% + $0.10 | Purchasing | 3. Settle within 29 days |
| | | | 4. CPS requirements are not met |
| Credit Voucher-Consumer Card-Credit | −1.73% | Consumer Credit | 1. Non-Passenger Transport merchants |
| Credit Voucher-Consumer Card-Debit | −1.31% | Non-PIN Debit | 2. Return credits apply to U.S. originating transactions only |
| Credit Voucher-Commercial Card | −2.24% | All Commercial | 1. Available to most businesses, other than passenger transport |
| | | | 2. Return credits apply to U.S. originating transactions only |
| Credit Voucher-MO/TO & E-Commerce-Credit | −2.04% | Consumer Credit | 1. MO/TO-E-Commerce merchants |
| Credit Voucher-MO/TO & E-Commerce-Debit | −1.87% | Non-PIN Debit | 2. Return credits apply to U.S. originating transactions only |
| | | | 3. Must qualify 70% or more of the dollar volume in consumer sales at Card Not Present (MO/TO), E-Commerce Basic, or E-Commerce Preferred |
| Credit Voucher Passenger Transport-Credit | −2.06% | Consumer Credit | 1. Passenger Transport merchants |
| Credit Voucher Passenger Transport-Debit | −1.18% | Non-PIN Debit | 2. All card types eligible |

MasterCard ® Interchange level

| | Interchange Rate | Card Type | Primary Qualification Criteria |
|---|---|---|---|
| Merit III-Credit | 1.64% + $0.10 | Consumer Credit | 1. Swipe card, obtain customer's signature |
| Merit III-Debit | 1.05% + $0.15 | Non-PIN Debit | 2. Obtain and pass 1 valid electronic authorization |
| Merit III-World Card | 1.73% + $0.10 | World Card | 3. Authorize and settle within 1 day |
| Merit III-World Elite | 2.20% + $0.10 | World Elite | 4. Beauty Salon (MCC 7230) have 25% tolerance. Restaurants (MCC 5812), Fast Food Restaurants (MCC 5814) and Bars (MCC 5813) are exempt from transaction tolerance. All others have a 10% tolerance. |

-continued

| | Interchange Rate | Card Type | Primary Qualification Criteria<br>Primary qualification criteria applies to the card products listed in the Card Type column unless otherwise indicated |
|---|---|---|---|
| Merit III-Enhanced | 1.64% + $0.10 | Enhanced | 5. MO/TO MCC's 5960, 5962, 5964, 5965, 5966, 5967, 5968, or 5969 not eligible<br>6. Authorization and settlement MCC must match |
| Merit I-Credit | 1.95% + $0.10 | Consumer Credit | 1. Key-entered transaction |
| Merit I-Debit | 1.64% + $0.16 | Non-PIN Debit | 2. Obtain and pass 1 valid electronic authorization |
| Merit I-World Card | 2.05% + $0.10 | World Card | 3. Settle within 2 days. |
| Merit I-World Elite | 2.50% + $0.10 | World Elite | 4. Beauty Salon (MCC 7230) have 25% tolerance. Restaurants (MCC 5812), Fast Food Restaurants (MCC 5814), Bars (MCC 5813), Limousines and Taxis (4121), Airlines and Non-face-to-face are exempt from transaction tolerance. All others have a 10% tolerance. |
| Merit I-Enhanced | 1.95% + $0.10 | Enhanced | 5. Authorization and settlement MCC must match |
| Key Entered-Credit | 1.95% + $0.10 | Consumer Credit | 1. Key-entered transaction |
| Key Entered-Debit | 1.64% + $0.16 | Non-PIN Debit | 2. Obtain and pass 1 valid electronic authorization |
| Key Entered-World Card | 2.05% + $0.10 | World Card | 3. Settle within 1 day. |
| Key Entered-World Elite | 2.50% + $0.10 | World Elite | 4. Restaurants (MCC 5812, 5814) and Bars (5813) are exempt from transaction tolerance. All others can settle within 10%. |
| Key Entered-Enhanced | 1.95% + $0.10 | Enhanced | 5. Authorization and settlement MCC must match |
| Merit I E-Commerce-Credit | 1.95% + $0.10 | Consumer Credit | 1. Key-entered transaction |
| Merit I E-Commerce-Debit | 1.64% + $0.16 | Non-PIN Debit | 2. Obtain and pass 1 valid electronic authorization |
| Merit I E-Commerce-World Card | 2.05% + $0.10 | World Card | 3. Settle within 2 days. |
| Merit I E-Commerce-World Elite | 2.50% + $0.10 | World Elite | 4. Non-face-to-face, Automated Fuel Dispenser, Airline and Mail/Phone Order (all identified by MCC) transactions have no restrictions on differences between authorized and settled amount. E-Commerce - Exempt from amount tolerance if E-Commerce Indicators are present in auth and clearing. 10% transaction tolerance if E-Commerce Indicators are not present. |
| Merit I E-Commerce-Enhanced | 1.95% + $0.10 | Enhanced | 5. E-Commerce transactions must include Card Activated Terminal (CAT) level 6 in settlement<br>6. Authorization and settlement MCC must match |
| UCAF "SecureCode"-Credit | 1.64% + $0.10 | Consumer Credit | 1. Key enter transaction |
| UCAF "SecureCode"-Debit | 1.05% + $0.15 | Non-PIN Debit | 2. Merchant is enrolled in UCAF and cardholder is not |
| UCAF "SecureCode"-World Card | 1.73% + $0.10 | World Card | 3. Available to all except MCC 5542-Automated Fuel Dispenser |
| UCAF "SecureCode"-World Elite | 2.20% + $0.10 | World Elite | 4. Settle within 1 day |
| UCAF "SecureCode"-Enhanced | 1.64% + $0.10 | Enhanced | 5. Internet transactions must include UCAF Collection Indicator of "1" and a CAT level of "6" |
| (Universal Cardholder Authentication Field) | | | 6. Authorization and settlement MCC must match with the exception of 4722 or 4511<br>7. The approval code in the clearing transaction must exactly match the approval code in the authorization log record except when the Issuer failed to return a valid approval code, or when the a "Refer to Card Issuer" response is received<br>8. Obtain and pass 1 valid electronic authorization<br>9. Security Code Indicator/Security Protocol Indicating merchant participating |

-continued

| | Interchange Rate | Card Type | Primary Qualification Criteria<br>Primary qualification criteria applies to the card products listed in the Card Type column unless otherwise indicated |
|---|---|---|---|
| Full UCAF "SecureCode"-Credit | 1.74% + $0.10 | Consumer Credit | 1. Key enter transaction |
| Full UCAF "SecureCode"-Debit | 1.15% + $0.15 | Non-PIN Debit | 2. Merchant is enrolled in UCAF and transaction is fully authenticated by the cardholder entering their SecureCode |
| Full UCAF "SecureCode"-World Card | 1.83% + $0.10 | World Card | 3. Available to all except MCC 5542-Automated Fuel Dispenser |
| Full UCAF "SecureCode"-World Elite | 2.30% + $0.10 | World Elite | 4. Settle within 1 day |
| Full UCAF "SecureCode"-Enhanced | 1.74% + $0.10 | Enhanced | 5. Internet transactions must include UCAF Collection Indicator of "2" and a CAT level of "6" |
| (Universal Cardholder Authentication Field) | | | 6. Authorization and settlement MCC must match with the exception of 4722 or 4511<br>7. The approval code in the clearing transaction must exactly match the approval code in the authorization log record except when the Issuer failed to return a valid approval code, or when the a "Refer to Card Issuer" response is received<br>8. Obtain and pass 1 valid electronic authorization<br>9. Security Code Indicator/Security Protocol Indicating merchant participating |
| Public Sector | 1.55% + $0.10 | Consumer Credit | 1. Available to Courts (MCC 9211), Fines (MCC 9222), Bail Bonds (9223), Taxes (MCC 9311), Government not elsewhere classified (MCC 9399), Transportation (MCC 4111), Bridge/Road Fees & Tolls (MCC 4784), and Postal Services-Government only (MCC 9402) |
| World Public Sector | 1.55% + $0.10 | World Card | 2. Obtain and pass 1 valid electronic authorization; |
| World Elite Public Sector | 1.55% + $0.10 | World Elite | 3. Authorize and settle within 2 days |
| Public Sector-Enhanced | 1.55% + $0.10 | Enhanced | 4. Authorization and settlement MCC must match |
| | | | 5. Can settle within 10% of authorized amount |
| Supermarket-Credit | 1.48% + $0.05 | Consumer Credit | 1. Available to Supermarkets (MCC 5411) |
| Supermarket-Debit | 1.05% + $0.15 ($0.35 cap) | Non-PIN Debit | 2. Swipe card, obtain customer's signature |
| Supermarket-World Card | 1.58% + $0.05 | World Card | 3. Obtain and pass 1 valid electronic authorization |
| Supermarket-World Elite | 1.90% + $0.05 | World Elite | 4. Authorize and settle within 1 day |
| Supermarket-Enhanced | 1.48% + $0.05 | Enhanced | 5. Can settle within 10% of authorized amount |
| | | | 6. Must be registered with MasterCard ® and have Supermarket (S) code<br>7. Authorization and settlement MCC must match |
| Convenience-Credit | 1.90% | Consumer Credit | 1. Available to Miscellaneous Movie Theaters (MCC 7832), Fast Food Restaurants (MCC 5814), Food Stores (MCC 5499), and Limousines and Taxicabs (MCC 4121) |
| Convenience-World Card | 2.00% | World Card | 2. Swipe card or customer initiates a Card Activated Terminal (CAT), obtain customer's signature when the transaction is face-to-face |
| Convenience-World Elite | 2.00% | World Elite | 3. If transaction is under $25 and "Q" code on account no signature required |
| Convenience-Enhanced | 1.90% | Enhanced | 4. Obtain and pass 1 valid electronic authorization |
| | | | 5. Authorize and settle with in 1 day<br>6. Require a CAT Level of "7" or space for Cardholder Activated Terminals<br>7. $25.00 transaction limit<br>8. Convenience Stores (MCC 5499) and Movie Theaters (MCC 7832) can settle within 10% of the authorized amount for transactions over $10.00. Restaurants (MCC 5814) and Limousines and Taxis (MCC 4121) are exempt from transaction tolerance.<br>9. Authorization and settlement MCC must match |

-continued

| | Interchange Rate | Card Type | Primary Qualification Criteria<br>Primary qualification criteria applies to the card products listed in the Card Type column unless otherwise indicated |
|---|---|---|---|
| Passenger Transport-Credit | 1.83% + $0.10 | Consumer Credit | 1. Available to Passenger Transport merchants |
| Passenger Transport-Debit | 1.60% + $0.15 | Non-PIN Debit | 2. Swipe or key-enter transaction, obtain customer's signature when the transaction is face-to-face |
| Passenger Transport-World Card | 2.30% + $0.10 | World Card | 3. Obtain and pass 1 valid electronic authorization; |
| Passenger Transport-Enhanced | 1.83% + $0.10 | Enhanced | 4. Settle within 8 days |
| | | | 5. Transaction must include passenger name, ticket number, issuing carrier and itinerary data in settlement |
| | | | 6. Authorization and settlement MCC must match |
| Consumer Standard-Credit | 2.75% + $0.10 | Consumer Credit | 1. Swipe or key-enter transaction, get customer signature when the transaction is face-to-face |
| Consumer Standard-Debit | 1.90% + $0.25 | Non-PIN Debit | 2. Electronic authorization not required |
| Consumer Standard-World Card | 2.95% + $0.10 | World Card | 3. Settle within 29 days |
| Consumer Standard-World Elite | 3.25% + $0.10 | World Elite | |
| Consumer Standard-Enhanced | 2.75% + $0.10 | Enhanced | |
| Petroleum-Credit | 1.90% ($0.95 cap) | Consumer Credit | 1. Available to Service Stations (MCC 5541) or Automated Fuel Dispensers (MCC 5542) |
| Petroleum-World Card | 2.00% ($0.95 cap) | World Card | 2. Swipe card, obtain customer's signature |
| Petroleum-World Elite | 2.00% ($0.95 cap) | World Elite | 3. Authorize and settle within 1 day |
| Petroleum-Enhanced | 1.90% ($0.95 cap) | Enhanced | 4. Obtain and pass 1 valid electronic authorization |
| Service Station-Debit | 0.70% + $0.17 ($0.95 cap) | Non-PIN Debit | 5. MCC 5542 Magnetic Stripe read requires CAT Level of '1' or '2'. Transponder read requires CAT Level of '7'. |
| Petroleum/Automated Fuel Dispenser-Debit | 0.70% + $0.17 ($0.95 cap) | Non-PIN Debit | 6. Authorization and settlement MCC must match |
| Emerging Market Debit | 0.80% + $0.25 | Non-PIN Debit | 1. Available to Government (MCC 9211, 9222, 9223, 9311, 9399), Schools (MCC 8211, 8220, 8299), Utilities (MCC 4900, 4899), Insurance (MCC 6300, 5960), Transportation (MCC 4111), Bridge & Road Fees/Tolls (MCC 4784), Postal Services-Government only (MCC 9402)<br>2. Swipe or key-enter transaction, obtain customer's signature when the transaction is face-to-face<br>3. Obtain and pass 1 valid electronic authorization<br>4. Authorize and settle within 2 days<br>5. Authorization and settlement MCC must match |
| Restaurant Debit | 1.19% + $0.10 | Non-PIN Debit | 1. Available to Restaurants (MCC 5812) & Fast Food Restaurants (MCC 5814)<br>2. Swipe card, obtain customer's signature<br>3. Authorize and settle within 1 day<br>4. Obtain and pass 1 valid electronic authorization<br>5. Authorization and settlement MCC must match |
| Small Ticket Debit | 1.55% + $0.04 | Non-PIN Debit | 1. Available to Local Commuter Transport (MCC 4111), Taxi/Limo Service (MCC 4121), Parking Lots (MCC 7523), Video Rental (MCC 7841), Theaters (MCC 7832), Misc Food Stores (MCC 5499), Restaurants (MCC 5812) & Fast Food Restaurants (MCC 5814); Bus Lines (MCC 4131), Bridge & Road Tolls (MCC 4784), News Dealers & Newsstands (MCC 5994), Laundry Services (MCC 7211), Dry Cleaners (MC 7216), Quick Copy, Reproduction & Blueprinting Services (MCC 7338), Car Washes (MCC 7542) |

|  | Interchange Rate | Card Type | Primary Qualification Criteria<br>Primary qualification criteria applies to the card products listed in the Card Type column unless otherwise indicated |
|---|---|---|---|
|  |  |  | 2. Swipe card, customer's signature not required<br>3. Obtain and pass 1 valid electronic authorization<br>4. Authorize and settle within 1 day<br>5. Restaurants (MCC 5812, 5814) and Limousines and Taxis (MCC4121) are exempt from transaction tolerance, others can settle within 10%<br>6. Must be equal to or less than $15.00<br>7. Authorization and settlement MCC must match |
| Utility-Credit | $0.75 | Consumer Credit | 1. Swiped or Key-enter transaction |
| Utility-Debit | $0.75 | Non-PIN Debit | 2. obtain and pass 1 valid electronic authorization |
| Utility-World Card | $0.75 | World Card | 3. Available to utility merchants with MCC 4900 (water, gas, electrical, sanitation) |
| Utility-World Elite | $0.75 | World Elite | 4. Authorize and settle within 1 day |
| Utility-Enhanced | $0.75 | Enhanced | 5. Can settle within 10% of authorized amount |
|  |  |  | 6. Must be registered with MasterCard<br>7. Authorization and settlement MCC must match |
| World MasterCard ® T&E | 2.30% + $0.10 | World Card | 1. Swipe or key-enter transaction, obtain customer's signature when the transaction is face-to-face |
| World Elite T&E | 2.75% + $0.10 | World Elite | 2. Obtain and pass 1 valid electronic authorization<br>3. Settle within 2 days, Hotels, Car Rental Agencies & Cruise Lines are exempt from timeliness edits<br>4. Authorization and settlement MCC must match<br>5. T&E merchants only<br>6. Vehicle Rental merchants must include the Rental Agreement number and Return Location ID<br>7. MCC 5812 transaction must be greater than $60.00 |
| World MasterCard ® Restaurant | 1.73% + $0.10 | World Card | 1. Available to Restaurants (MCC 5812) with a transaction amount equal to or less than $60.00 |
| World Elite Restaurant | 1.73% + $0.10 | World Elite | 2. Swipe card, obtain customer's signature |
|  |  |  | 3. Authorize and settle within 1 day<br>4. Obtain and pass 1 valid electronic authorization<br>5. Authorization and settlement MCC must match |
| World Elite Airline | 2.30% + $0.10 | World Elite | 1. Available to Airline merchants (MCC 3000-3350, 4511)<br>2. Swipe or key-enter transactions, obtain customer's signature when the transaction is face-to-face<br>3. Obtain and pass 1 valid electronic authorization<br>4. Settle within 2 days<br>5. Transaction must include passenger name, ticket number, issuing carrier and itinerary data in settlement<br>6. Authorization and settlement MCC must match |
| Foreign Electronic<br><br>(Intl Electronic Interchange-IEI) | 1.37% | Consumer Credit-Non US Issued | 1. Swipe card, obtain customer's signature<br><br>2. Obtain and pass 1 valid electronic authorization<br>3. Settle within 4 days<br><br>4. Can settle within 10% of authorized amount<br>5. MO/TO MCC's 5960, 5962, 5964, 5965, 5966, 5967, 5968, or 5969 not eligible<br>6. Authorization and settlement MCC must match |
| Foreign Standard<br>(Intl Standard Interchange-ISI) | 2.10% + $0.10 | Consumer Credit-Non US Issued | 1. Swipe or key-enter transaction, get customer signature when the transaction is face-to-face<br>2. Settle within 29 days |
| Travel Premier Service (TIPS)-Credit | 1.74% + $0.10 | Consumer Credit | 1. Merchants with a Non-Generic T&E MCC code (except cruise lines MCC 4411) |
| Travel Premier Service (TIPS)-Debit | 1.36% + $0.15 | Non-PIN Debit | 2. Key-enter transaction on subsequent stays with signature on file |

-continued

| | Interchange Rate | Card Type | Primary Qualification Criteria<br>Primary qualification criteria applies to the card products listed in the Card Type column unless otherwise indicated |
|---|---|---|---|
| Travel Premier Service (TIPS)-Enhanced | 1.74% + $0.10 | Enhanced | 3. Obtain and pass 1 valid electronic authorization<br>4. Settle within 1 day<br>5. Registered with MasterCard, Preferred Customer indicator must be present<br>6. Transaction must include settlement detail addendum<br>7. Authorization and settlement MCC must match |
| Service Industries Incentive Program (SIIP)-Credit | 1.15% + $0.05 | Consumer Credit | 1. Key-enter transaction |
| Service Industries Incentive Program (SIIP)-Debit | 1.15% + $0.05 | Non-PIN Debit | 2. Available to Insurance Services (MCC 5960), Utility (MCC 4900), Insurance (MCC 6300), and Cable & Telecommunication (MCC 4812, 4814, 4899) merchants |
| Service Industries Incentive Program (SIIP)-World Card | 1.15% + $0.05 | World Card | 3. Obtain and pass 1 valid electronic authorization |
| Service Industries Incentive Program (SIIP)-World Elite | 1.15% + $0.05 | World Elite | 4. Authorize and settle within 1 day |
| Service Industries Incentive Program (SIIP)-Enhanced | 1.15% + $0.05 | Enhanced | 5. Can settle within 10% of authorized amount<br>6. Must be registered with MasterCard ® and Recurring Payments indicator must be present<br>7. Authorization and settlement MCC must match |
| Commercial T&E II | 2.20% + $0.10 | Commercial | 1. Available to T&E merchants; Restaurants are not eligible - Best Commercial card rate for T&E |
| Commercial T&E II - World Corporate | 2.20% + $0.10 | World Corporate | 2. Swipe or key-enter transaction, obtain customer's signature when transaction is face-to-face |
| Commercial T&E II - World Business | 2.35% + $0.10 | World Business | 3. Obtain and pass 1 valid electronic authorization |
| Commercial T&E II - World Elite Corporate | 2.20% + $0.10 | World Elite Corporate | 4. Settle within 2 days, Airline 8 days |
| Commercial T&E II - World Elite Business | 2.35% + $0.10 | World Elite Business | 5. Must pass industry specific T&E II criteria; folio #, rental agreement #, check-in/pick up and checkout/return dates, duration, no show indicator/extra charge indicator<br>6. Authorization and settlement MCC must match<br>7. Exempt from amount tolerance |
| Commercial T&E I | 2.35% | Commercial | 1. Available to T&E merchants |
| Commercial T&E I - World Corporate | 2.35% | World Corporate | 2. Swipe or key-enter transaction, obtain customer's signature when transaction is face-to-face |
| Commercial T&E I - World Business | 2.50% | World Business | 3. Obtain and pass 1 valid electronic authorization |
| Commercial T&E I - World Elite Corporate | 2.35% | World Elite Corporate | 4. Settle within 2 days, Airline 8 days |
| Commercial T&E I - World Elite Business | 2.50% | World Elite Business | 5. Authorization and settlement MCC must match<br>6. Exempt from amount tolerance |

-continued

| | Interchange Rate | Card Type | Primary Qualification Criteria<br>Primary qualification criteria applies to the card products listed in the Card Type column unless otherwise indicated |
|---|---|---|---|
| T&E Large Ticket - World Elite | 2.00% | Consumer World Elite | 1. Available to T&E merchants |
| | | | 2. Swipe or key-enter transaction, obtain customer's signature when transaction is face-to-face<br>3. Obtain and pass 1 valid electronic authorization<br>4 Must be equal to or greater than $2500.00<br>5. Settle within 2 days |
| Commercial Data Rate III | 1.75% | Commercial | 1. Swipe or Key-enter transaction |
| Commercial Data Rate III - World Corporate | 1.75% | World Corporate | 2. Non-T&E merchant |
| Commercial Data Rate III - World Business | 1.90% | World Business | 3. Obtain and pass 1 valid electronic authorization |
| Commercial Data Rate III - World Elite Corporate | 1.75% | World Elite Corporate | 4. Must submit a valid tax id |
| Commercial Data Rate III - World Elite Business | 1.90% | World Elite Business | 5. Settle within 2 days |
| | | | 6. Must pass Level II and Level III Data<br>7. Authorization and settlement MCC must match |
| Commercial Large Ticket I | 1.20% + $40.00 | Commercial | 1. Swipe or Key-enter transaction, obtain customer's signature when transaction is face-to-face |
| Commercial Large Ticket I - World Corporate | 1.20% + $40.00 | World Corporate | 2. Non-T&E merchants |
| Commercial Large Ticket I - World Business | 1.35% + $40.00 | World Business | 3. Obtain and pass 1 valid electronic authorization |
| Commercial Large Ticket I - World Elite Corporate | 1.20% + $40.00 | World Elite Corporate | 4. Must submit a valid tax id |
| Commercial Large Ticket I - World Elite Business | 1.35% + $40.00 | World Elite Business | 5. Settle within 1 day |
| | | | 6. Transaction must be greater than $5,333.33 and less than/equal to $25,000<br>7. Can settle within 25% of the authorized amount. AFD (MCC 5542), Bars (MCC 5813), and Fast Food Restaurants (MCC 5814) are exempt from the tolerance test.<br>8. Must pass Level II & III Data<br>9. Authorization and settlement MCC must match |
| Commercial Large Ticket II | 1.20% + $40.00 | Commercial | 1. Swipe or Key-enter transaction, obtain customer's signature when transaction is face-to-face |
| Commercial Large Ticket II - World Corporate | 1.20% + $40.00 | World Corporate | 2. Non-T&E merchants |
| Commercial Large Ticket II - World Business | 1.35% + $40.00 | World Business | 3. Obtain and pass 1 valid electronic authorization |
| Commercial Large Ticket II - World Elite Corporate | 1.20% + $40.00 | World Elite Corporate | 4. Must submit a valid tax id |
| Commercial Large Ticket II - World Elite Business | 1.35% + $40.00 | World Elite Business | 5. Settle within 1 day |
| | | | 6. Transaction must be greater than $25,000.00 but less than/equal to $100,000 |

-continued

| | Interchange Rate | Card Type | Primary Qualification Criteria<br>Primary qualification criteria applies to the card products listed in the Card Type column unless otherwise indicated |
|---|---|---|---|
| | | | 7. Can settle within 25% of the authorized amount. AFD (MCC 5542), Bars (MCC 5813), and Fast Food Restaurants (MCC 5814) are exempt from the tolerance test.<br>8. Must pass Level II & III Data<br>9. Authorization and settlement MCC must match |
| Commercial Large Ticket III | 1.20% + $40.00 | Commercial | 1. Swipe or Key-enter transaction, obtain customer's signature when transaction is face-to-face |
| Commercial Large Ticket III - World Corporate | 1.20% + $40.00 | World Corporate | 2. Non-T&E merchants |
| Commercial Large Ticket III - World Business | 1.35% + $40.00 | World Business | 3. Obtain and pass 1 valid electronic authorization |
| Commercial Large Ticket III - World Elite Corporate | 1.20% + $40.00 | World Elite Corporate | 4. Must submit a valid tax id |
| Commercial Large Ticket III - World Elite Business | 1.35% + $40.00 | World Elite Business | 5. Settle within 1 day |
| | | | 6. Transaction must be greater than $100,000.00<br>7. Can settle within 25% of the authorized amount. AFD (MCC 5542), Bars (MCC 5813), and Fast Food Restaurants (MCC 5814) are exempt from the tolerance test.<br>8. Must pass Level II & III Data<br>9. Authorization and settlement MCC must match |
| Commercial Data Rate II | 2.05% | Commercial | 1. Swipe or key-enter transaction; obtain customers signature when the transaction is face to face |
| Commercial Data Rate II - World Corporate | 2.05% | World Corporate | 2. Obtain and pass 1 valid electronic authorization |
| Commercial Data Rate II - World Business | 2.20% | World Business | 3. Must submit a valid tax id |
| Commercial Data Rate II - World Elite Corporate | 2.05% | World Elite Corporate | 4. Settle within 2 days for Commercial Data Rate II |
| Commercial Data Rate II - World Elite Business | 2.20% | World Elite Business | 5. Non-T&E merchant |
| | | | 6. Must pass Level II Data<br>7. Authorization and settlement MCC must match<br>8. Can settle within 10% of authorized amount |
| Commercial Face to Face | 2.05% | Commercial | 1. Swipe or key-enter transaction; obtain customers signature when the transaction is face to face |
| Commercial Face to Face - World Corporate | 2.05% | World Corporate | 2. Obtain and pass 1 valid electronic authorization |
| Commercial Face to Face - World Business | 2.20% | World Business | 3. Must submit a valid tax id |
| Commercial Face to Face - World Elite Corporate | 2.05% | World Elite Corporate | 4. Settle within 1 day for Commercial Face-to-Face |
| Commercial Face to Face - World Elite Business | 2.20% | World Elite Business | 5. Non-T&E merchant |
| | | | 6. Must pass Level II Data<br>7. Authorization and settlement MCC must match<br>8. Can settle within 10% of authorized amount |

-continued

| | Interchange Rate | Card Type | Primary Qualification Criteria<br>Primary qualification criteria applies to the card products listed in the Card Type column unless otherwise indicated |
|---|---|---|---|
| Commercial Data Rate I | 2.65% + $0.10 | Commercial | 1. Swipe or key-enter transaction |
| Commercial Data Rate I - World Corporate | 2.65% + $0.10 | World Corporate | 2. Obtain and pass 1 valid electronic authorization |
| Commercial Data Rate I - World Business | 2.80% + $0.10 | World Business | 3. Must submit a valid tax id |
| Commercial Data Rate I - World Elite Corporate | 2.65% + $0.10 | World Elite Corporate | 4. Non-T&E merchant |
| Commercial Data Rate I - World Elite Business | 2.80% + $0.10 | World Elite Business | 5. Settle within 2 days |
| | | | 6. Authorization and settlement MCC must match |
| Commercial Standard | 2.70% + $0.10 | Commercial | 1. Swipe or key-enter transaction, obtain customer's signature when transaction is face-to-face |
| Commercial Standard - World Corporate | 2.70% + $0.10 | World Corporate | 2. Electronic authorization not required |
| Commercial Standard - World Business | 2.85% + $0.10 | World Business | 3. Settle within 29 days |
| Commercial Standard - World Elite Corporate | 2.70% + $0.10 | World Elite Corporate | |
| Commercial Standard - World Elite Business | 2.85% + $0.10 | World Elite Business | |
| International Purchasing Data Rate II | 1.55% | Purchasing/Fleet-Non US Issued | 1. Swipe or key-enter transaction, obtain customer's signature when transaction is face-to-face<br>2. Obtain and pass 1 valid electronic authorization<br>3. Settle within 4 days<br>4. Must pass Level II Data<br>5. Fleet Cards at Fuel MCC 5541, 5542 or 7511 are not eligible |
| International Purchasing Large Ticket | 0.75% + $30.00 | Purchasing/Fleet-Non US Issued | 1. Swipe or key-enter transaction, obtain customer's signature when transaction is face-to-face<br>2. Obtain and pass 1 valid electronic authorization<br>3. Settle within 29 days<br>4. Must be a non T&E merchant<br>5. Transaction must be equal to or greater than $5,333.33 |
| International Commercial Card | 2.15% | Commercial-Non US Issued | 1. Swipe or key-enter transaction, obtain customer's signature when transaction is face-to-face<br>2. Settle within 29 days |
| Consumer Debit Refund Group 1 | −1.72% | Non-PIN Debit | 1. Must be a Non-PIN Debit card, Mail Order/Telephone or E-Commerce--non-transaction. Transactions must be (identified by MCC) an MCC other than Airline or Passenger Railway |
| Consumer Debit Refund Group 2 | −1.68% | Non-PIN Debit | 1. Must be a Non-PIN Debit card. Transactions must be (identified by MCC) Airline or Passenger Railway |
| Consumer Debit Refund Group 3 | −1.40% | Non-PIN Debit | 1. Must be a Non-PIN Debit card. This program is for face-to-face transactions<br><br>Transactions must be (identified) an MCC other than Mail/Telephone Order, Airline or Passenger Railway. |
| Consumer Credit Refund Group 1 | −2.42% | Consumer Credit | 1. Must be a World MasterCard; Transactions must be (identified by MCC) Airline, Automobile/Vehicle Rental, Hotels/Motels, Passenger Railways, Cruise Lines, Travel Agencies, Restaurants, Other Lodging, Automobile Rental Agency, Truck and Utility Trailer Rentals |

-continued

| | Interchange Rate | Card Type | Primary Qualification Criteria<br>Primary qualification criteria applies to the card products listed in the Card Type column unless otherwise indicated |
|---|---|---|---|
| Consumer Credit Refund Group 2 | −2.09% | Consumer Credit | 1. Must be a consumer card; Transactions must be (identified by MCC) Mail/Telephone Order, Utilities and Travel Agencies |
| Consumer Credit Refund Group 3 | −1.95% | Consumer Credit | 1. Must be a consumer card; Transactions must be (identified by MCC) Airline Professional Services, Drug Stores, Recreation, Education, Repair Shops, Other Services or Restaurants/Bars |
| Consumer Credit Refund Group 4 | −1.82% | Consumer Credit | 1. Must be a consumer card; Transactions must be (identified by MCC) Automobile/Vehicle Rental, Other Retail, Gas Stations, Hardware, Health Care, Sporting-Toy Stores, Discount Stores, Clothing Stores, Other transport services. |
| Consumer Credit Refund Group 5 | −1.73% | Consumer Credit | 1. Must be a consumer card; Transactions must be (identified by MCC) Hotel/Motel, Department Stores, Electric-Appliance, Interior Furnishings, Vehicles, Quasi Cash, Food Stores-Warehouse |
| Corporate Credit Refund Group 1 | −2.37% | Commercial | 1. Must be a commercial card; Transactions must be (identified by MCC) Quasi Cash, Other Transport, Food Stores-Warehouse, Discount Stores, Drug Stores, Recreation, Restaurants/Bars, Utilities |
| Corporate Credit Refund Group 2 | −2.30% | Commercial | 1. Must be a commercial card; Transactions must be (identified by MCC) Automobile/Vehicle Rental, Hotel/Motel, Sporting-Toys Stores, Education, Repair Shops, Travel Agencies, Vehicle |
| Corporate Credit Refund Group 3 | −2.21% | Commercial | 1. Must be a commercial card; Transactions must be (identified by MCC) Airline, Other Retail, Mail/Telephone Order, Health Care, Professional Services, Other Services, Hardware |
| Corporate Credit Refund Group 4 | −2.16% | Commercial | 1. Must be a commercial card; Transactions must be (identified by MCC) Department Store, Electric-Appliances, Gas Stations, Interior Furnishings |

Areas of business, types of information received, and how that information is received are described in the column labeled "Primary Qualification Criteria". The fourth parameter is set forth in its own column, labeled "Card Type". Note that types of information that may be received include, for example, a card number, a card security code number, a zip code, a billing address, a debit security code, having an address for the customer included with the transaction, and a customer's signature. The types of ways in which information may be received include, for example, in person (e.g., card present or not present), electronically over the Internet, over the phone, through a card-swipe card reader, through a key-faub reader, through manual entry by a non-card holder, and through card-holder entry into a keypad. Types of cards used include, for example, a credit card, a debit card, a key faub, and an account without a physical device.

As is apparent from the above table, the depth and breadth of factors that may go into how a card issuer assigns interchange categories can be quite complex.

Figure 5:
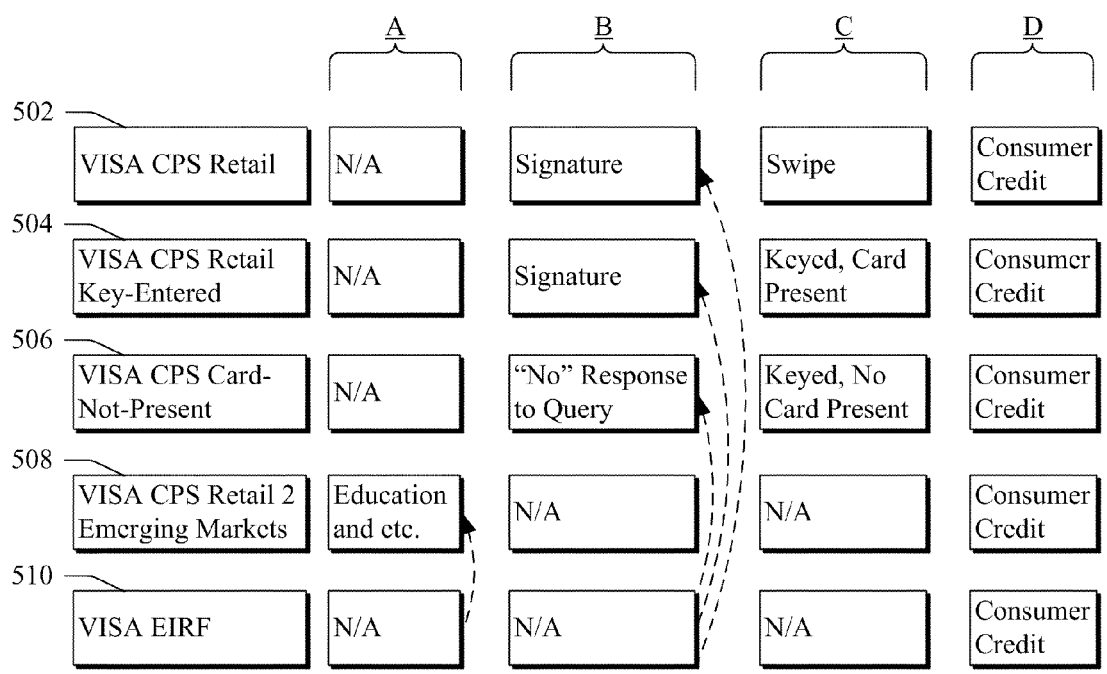
FIG. 5 illustrates example interchange categories with simplified parameters divided into four groups.

Some example interchange categories are illustrated in FIG. 5, which shows the categories and parameters used in assigning them. These categories include, all for credit cards rather than debit, VISA® CPS Retail 502, VISA® CPS Retail Key-Entered 504, VISA® CPS Card-Not-Present 506, VISA® CPS Retail 2 Emerging Markets 508, and VISA® EIRF 510. A simplification of the parameters used for each are shown and divided into four groups. The categories include a merchant's area of business "A", information received for transaction "B", how information was received "C", and type of card used "D". Each category's parameters are labeled or referred to herein separately (e.g., category 502's area of business is 502*a*, category 506's type of card used is 506*d*, and etc.). These categories will be used as the example unfolds.

At arrow 4-2, the category entity determines, for each business type, which higher-cost interchange categories may be replaced by one or more lower-cost interchange categories. Some of the parameters are set by the category entity as ones that do not easily change, such as the type of card used and whether the card was present or not (e.g., swiped at the merchant or entered via an Internet sale). This aids in building a map, for each business area, of higher-cost interchange categories that may be replaced by lower-cost interchange categories by changing parameters that either are relatively easy for a merchant to change or that a merchant is willing to change (e.g., requiring that no debit cards be used is often not acceptable to a merchant because it may reduce sales). Note that there may be intermediate levels in this map; some interchange categories that are lower cost in relation to one higher-cost interchange category may themselves be considered a higher-cost interchange category in relation to some other, still lower-cost interchange category(s).

In this example the business type is retail education, that is, merchants that accept retail sales in a not-for-profit educational entity. In this business area, there are many interchange categories that may potentially be altered to lower fees. Particular examples of these are described later below.

At arrow 4-3, the category entity determines parameter changes that need to be implemented to have transactions currently assigned a higher-cost interchange category to instead be assigned a lower-cost interchange category. As noted above, these parameters may include some but not all parameters or types of parameters.

For example, assume that one of many interchange categories that may be replaced for lower-cost categories is the VISA® EIRF interchange category. This category may be replaced by any one of the four categories listed above and shown in FIG. 5. The parameters needed to change this category are shown with dashed-line arrows in FIG. 5. The parameter changes include one or more of the following: getting a signature; responding "No" to a prompt asking if the card is present; and taking into account an education area of business.

At this point, the category module, through the category entity, knows which interchange categories may be replaced by lower-cost interchange categories for each potential business area for which a merchant may be qualified and the parameters needed to affect this change. With this information, the tools proceed to arrow 4-4.

At arrow 4-4, the category entity receives or determines a correct area of business for a particular merchant. The category entity here includes involvement of a person knowing details about the merchant at issue. In some cases, however, the category entity may determine this implicitly based on interchange categories assigned to the merchant by the card issuer. Basing this determination on information from the merchant processor or based on the card issuer's determination, however, may reduce the effectiveness of the tools auditing functions.

In this example the category entity determines, based on information from the national bookstore chain indicating that the merchant sells textbooks for a university bookstore, that the merchant operates in a Retail Education area of business. If this business area is not currently being assigned by the merchant processor, the category module may indicate this to a user so that the user can ask for the area of business to be changed. In this case the merchant was incorrectly assigned as a retail (not education) area of business in its historic merchant-processor statements and so qualifies for the VISA® CPS Retail 2 Emerging Markets interchange category without implementing a change to its procedures. Instead, the merchant must have its merchant processor change its area of business with regard to the card issuer.

Any of the prior actions of arrows 4-1 to 4-4 may be performed in the category entity as software or a person or both. Thus, a person or software may determine and provide to the category module the current interchange categories, their parameters, fees, and which can be replaced for each business area. If the category entity is software, it provides the results of arrows 4-1 to 4-4 to the category module through APIs, other software-to-software communication manners, or simply by being integral with the category module. If the category entity is a person, the category entity provides the results by data entry or other format usable by the category module. The category entity may also be both software and a person interacting, such as by the category entity retrieving parameters and the person deciding on the correct business area for a particular merchant. This communication is sent and received at arrow 4-5.

At arrow 4-6, the category module receives an interchange category assigned to transactions received by the merchant (e.g., in any of the merchant-processor statements in the last 12 months). Here the category module receives a merchant processor statement for the merchant, the following portion of which is stored in relational database 106 and provided to the category module:

| NUMBER | AMOUNT | DESCRIPTION | TOTAL |
|---|---|---|---|
| 10 | 586.95 | VISA ® STANDARD (2.63%XSALES + $.10XITEMS) | 16.44 |
| 350 | 12,452.24 | VISA ® RTL CK DB (1.05%XSALES + $.15XITEMS) | 183.25 |
| 461 | 27,404.65 | VISA ® CPS RETAIL (1.54%XSALES + $.10XITEMS) | 468.13 |
| 570 | 34,317.10 | VISA ® EIRF (2.30%XSALES + $.10XITEMS) | 846.29 |
| 16– | 662.12– | VISA ® CREDIT CONSUMER CARD @ 1.67% | 11.06– |
| 01– | 6.37– | VISA ® CREDIT COMMERCIAL CARD @ 2.24% | .14– |
| 47 | 1,716.92 | VISA ® EIRF DB (1.75%XSALES + $.20XITEMS) | 39.45 |
| 02 | 92.90 | VISA ® STANDARD DB(1.90%XSALES + $.25XITEMS) | 2.27 |
| 09– | 257.19– | VISA ® CV-CNSR DB (1.31%XSALES) | 3.37– |
|  | 52,203.43 | VISA ® DUES AND ASSESSMENTS (.0925%XSALES) | 48.29 |
| 10 | 1,577.69 | MC STANDARD (2.70%XSALES + $.10XITEMS) | 43.60 |
| 522 | 32,284.36 | MC MERIT 3 (1.54%XSALES + $.10XITEMS) | 549.38 |
| 06 | 1,579.45 | MC KEY ENTERED (1.90%XSALES + $.10XITEMS) | 30.61 |
| 81 | 3,821.95 | MC CORP DATA RT1(2.65%XSALES + $.10XITEMS) | 109.38 |
| 16 | 604.03 | MC STANDARD DB (1.90%XSALES + $.25XITEMS) | 15.48 |
| 10 | 203.57 | MC KEY ENTER DB (1.64%XSALES + $.16XITEMS) | 4.94 |
| 929 | 37,417.09 | MC MERIT 3 DB (1.05%XSALES + $.15XITEMS) | 532.23 |
| 19– | 371.74– | MC CONS DB RF 3 @1.40% | 5.20– |
| 19– | 668.64– | MC CONS CR RF 4 @1.77% | 11.83– |
| 02– | 139.68– | MC CORP CR RF 3 @2.15% | 3.00– |
|  | 77,488.14 | MC DUES AND ASSESSMENTS(.095%XSALES) | 73.61 |
| 65 | 6,311.88 | VISA ® BUS ELECT (2.20%XSALES + $.10XITEMS) | 145.36 |
| 05 | 206.18 | VISA ® BUS STD (2.70%XSALES + $.10XITEMS) | 6.07 |
| 296 |  | DISCOVER AUTHORIZATIONS @ 15 CENTS | 44.40 |

Also at arrow 4-6, the category module receives credit-card transaction data for transactions assigned the higher-cost interchange category (shown above). Based on the analysis by the category entity for any merchant having this business type, the category module now acts on this information based on the merchant having transactions assigned one of those higher-cost interchange categories.

Here the university bookstore merchant has 570 transactions totaling $34,317.10 and was charged $846.29 in interchange fees for the VISA® EIRF category. The category module also knows which lower-cost interchange categories may replace the EIRF category, namely VISA® CPS Retail, VISA® CPS Retail Key-Entered, VISA® CPS Card-Not-Present, and VISA® CPS Retail 2 Emerging Markets. The category entity determines that the other four categories shown in FIG. 5 may potentially replace VISA® EIRF, all four of which have lower fees.

The category entity determined, at arrow 4-2, that each of these four have lower fees based on their published fees rates—e.g., that EIRF costs 2.30% and $0.10 per transaction but that VISA® CPS Retail 502 costs 1.54% and $0.10 per transaction, VISA® CPS Key-Entered 504 costs 1.85% and $0.10 per transaction, VISA® CPS Card-Not-Present 506 costs 1.85% and $0.10 per transaction, and VISA® CPS Retail 2 Emerging Markets 508 costs 1.43% and $0.05 per transaction.

The category entity also determined at arrow 4-2 that each of these better categories is one in which the merchant has a relatively high amount of control over the parameters. The merchant is unlikely to be able to change a parameter from being a debit card to being a credit card unless the merchant wants to require that no debit cards or no credit cards be received. This is not often something a merchant is willing to do because it adversely affects sales. Thus, the category entity determines that the EIRF category may be replaced by any of the other four categories based on the information received and/or how the information is received. These parameters are often easier for a merchant to control and also ones that the merchant is willing to implement. Here the category entity includes decision making by a skilled person, though this decision-making may also be made based on algorithms approximating the skilled person's assessment.

At arrow 4-3, the category entity determined what parameter needs to be changed to alter the current category assigned to one of the better potential categories. As noted above, some of this analysis may already be done by the entity deciding to include only those categories having parameters that the merchant can easily change or is willing to change.

The VISA® EIRF category is assigned to cards that are classified consumer credit (e.g., non-business credit cards) where the information received and how it was received is not taken into consideration. Here the category entity determined that if the transaction was taken in person that, by requiring a signature with either a card swipe (VISA® CPS Retail) or a manually keyed in (VISA® CPS Retail Key-Entered), the transaction could instead by assigned these other categories. If, on the other hand, the transaction was taken without the person and card present, that by requiring a person handling the merchant (e.g., the device or account through which card numbers are entered) to response "No" to a query asking "Is the card present" that the transaction may be assigned a VISA® CPS Card-Not-Present category. Further, than VISA® EIRF may be replaced by the VISA® CPS Retail 2 Emerging Markets category simply by having the merchant processor change the business area for the merchant.

These parameter changes are illustrated in FIG. 5 with dashed arrows. Each dashed arrow representing a potential parameter change that would permit a lower-cost interchange category to be assigned to transactions rather than EIRF.

At arrow 4-6 the category module received credit-card transaction data for transactions assigned the higher-cost interchange category, such as from relational database 106. Based on the analysis by the category entity for any merchant having this business type, the category module now acts on this information based on the merchant having transactions assigned one of those higher-cost interchange categories.

At arrow 4-7, the category module calculates a potential fee savings if the transactions assigned the higher-cost interchange category were instead assigned the lower-cost interchange category. Here the category module calculates a fee savings between the VISA® EIRF category and each of the other four categories:

VISA® EIRF Fees are:

570*$0.10+$34,317.10*2.3%=$57.00+789.29=$846.29

CPS Retail Potential Fees and Savings would be:

570*$0.10+$34,317.10*1.54%=$57.00+$528.48=$585.48

$846.29−$585.48=$260.81 (savings)

CPS Retail Key-Entered Potential Fees and Savings would be:

570*$0.10+$34,317.10*1.85%=$57.00+$634.86=$691.87

$846.29−$691.87=$154.42 (savings)

CPS Card-Not-Present Potential Fees and Savings would be:

570*$0.10+$34,317.10*1.85%=$57.00+$634.86=$691.87

$846.29−$691.87=$154.42 (savings)

CPS Retail 2 Emerging Markets Potential Fees and Savings would be:

570*$0.10+$34,317.10*1.43%=$57.00+$490.73=$547.73

$846.29−$547.73=$298.56 (savings)

At arrow 4-8, the category module provides these potential savings and the parameter changes needed to change the EIRF category to one of the better categories. The category module provides this information to report generator module 118, which in turn lists the parameter changes needed and the potential savings associated with each. For the merchant processor statement above, the savings and parameter changes are:

Swipe Card (if needed) and Get Signature, Potential Savings would be:

$260.81

Key-Entered Card Number (if needed) and Get Signature, Potential Savings would be:

$154.42

Answer "No" to Query, Potential Savings would be:

$154.42

Alter Business Area to "Retail Education", Potential Savings would be:

$298.56

At this point various potential fee savings may be proposed to the merchant, such as ways to upgrade some types of future transactions from unfavorable (higher-cost) categories to more-favorable (lower-cost) categories. VISA® EIRF can be upgraded to the first three categories above by changing order-intake procedures. The tools may determine actual fees saved (not potential) based on these and other changes by comparing the adjusted baseline card-issuer interchange rate for the client with a current rate being assessed after implemented suggested parameter changes. Determining actual savings is described in the following section.

The tools may perform actions 4-6 and 4-7 many times, such as once for each interchange category that may be replaced by a lower-cost interchange category. If the national bookstore chain has 2,000 merchants and each has been assigned five categories that could be improved, the tools may perform these actions 10,000 times and for many different business areas. After performing these actions the tools may provide a detailed report on the potential savings available to each merchant or all the client's merchants based on savings for all its merchants.

In the following section, the tools find savings between an adjusted baseline interchange rate and a current rate. The current rate, as used therein, may be the rate after the suggested parameters changes are made by the client through its merchants. In so doing, the suggested changes provided by the category module may, when implemented, save a client a substantial amount of money in fees.

Determining Card-Issuer Interchange-Fee Savings

This section continues the above example in the context of credit-card transaction data being made available to interchange module 116 to determine a savings between an adjusted baseline interchange rate and a current rate. This data is made available following its being provided in FIG. 2, only in this section the interchange module determines a current rate rather than a baseline rate.

Figure 6:
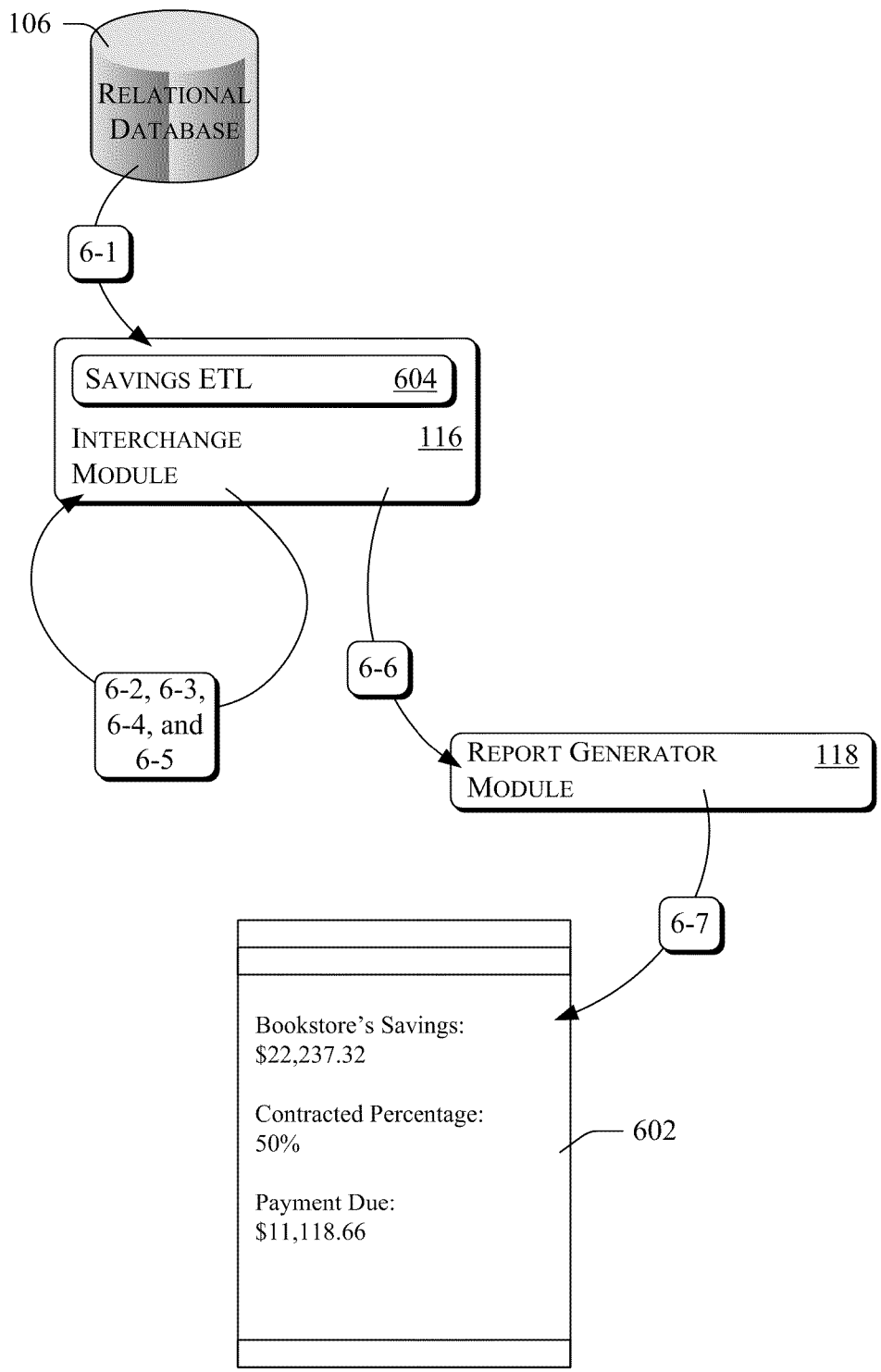
FIG. 6 illustrates an example flow diagram in which the tools determine a savings between an adjusted baseline interchange rate and a current rate.

At arrow 6-1 in FIG. 6, interchange module 116 extracts card-issuer interchange fees and dollar volumes on which the fees were assessed for all of the bookstore's 2,000 merchants over a current billing cycle. The interchange module uses each merchant's identifier (e.g., "932734932") and each billing cycle's end date (e.g., Apr. 30, 2007) to find this information in relational database 106. Consider a portion of a merchant-processor statement for the current billing period and for the same merchant described in FIGS. 2 and 3 above.

| FEES NUMBER | AMOUNT | DESCRIPTION | TOTAL |
|---|---|---|---|
| | | SUPPORT PACKAGE | 5.95 |
| 02 | 14.00 | TERMINAL FEE | 28.00 |
| 04 | 80.11 | VISA ® STANDARD (2.63%XSALES + $.10XITEMS) | 2.50 |
| ... | | | |
| 297 | | DISCOVER AUTHORIZATIONS @ 15 CENTS | 44.55 |
| | | OTHER FEES DUE | 1,991.20 |
| | DISCOUNT DUE | | 304.23 |
| | OTHER FEES DUE | | 1,991.20 |

At arrow 6-2, the interchange module adds up all the fees and dollar volumes on which interchange fees are charged for each merchant over the current billing cycle. Here the "Discover Authorization" fees and the terminal fees are excluded, as they are not an amount on which a card-issuer interchange fee is charged.

Thus, interchange fees for the particular merchant during the current billing cycle are:

Interchange Fees=$1,991.20−28.00−44.55=$1,918.65

The interchange module does this again for every merchant. By so doing, the interchange module determines the client's total fees and dollar volume on which the interchange fees were based for the current billing cycle.

At arrow 6-3, the interchange module divides the total interchange fees by this dollar volume to provide a current card-issuer interchange rate for the current billing cycle for the bookstore. For the particular merchant above, assume that the interchange dollar volume is $148,411.43. Thus, the current card-issuer interchange rate is:

Merchant's Current Rate=$1,918.65/$148,411.43=1.29%

For the bookstore, assume that the current total interchange fees are and total dollar volume on which these fees were charged is $31,000,000. The bookstore's current card-issuer interchange rate is:

Bookstore's Current Rate=$598,000/$31,000,000=1.93%

At arrow 6-4, the interchange module determines a rate difference between the bookstore's current rate and the bookstore's adjusted baseline card-issuer interchange rate by subtracting the current rate from the adjusted rate. The bookstore's rate difference is:

Bookstore's Rate Difference=2.00173333%−1.93%=0.0717333%

At arrow 6-5, the interchange module determines the interchange fee savings by multiplying the bookstore's rate difference by its dollar volume on which interchange fees were applied. The savings are:

Bookstore's Savings=$31,000,000×0.0717333%=$22,237.32

At arrow 6-6, the interchange module provides the bookstore's savings to report generator module 118. The report generator module receives the savings and generates a report that is human readable, shown at arrow 6-7 and with report 602. This report may be a window on a computer screen (e.g., a graphical user interface) or a PDF file for reading on a computer screen or printing and viewing on paper. This report generator may also, in conjunction with the interchange module or independently, multiply the savings by a particular percentage, such as one contractually agreed-on by the client (e.g., the bookstore) and the user of the interchange module to assess a payment for services rendered in reducing interchange fees.

The interchange module performs the actions of arrows 6-1 to 6-5 using a savings ETL package 604, shown included in the interchange module in FIG. 6. The act of extracting card-issuer interchange fees and dollar volumes of arrow 6-1 is performed by an Extract portion of an ETL process caused by the computing device executing the savings ETL package. The acts of adding up all the fees and dollar volumes, dividing the total interchange fees by this dollar volume, subtracting the current rate from the adjusted rate, and multiplying the bookstore's rate difference by its dollar volume on which interchange fees were applied, at arrows 6-2, 6-3, 6-4, and 6-5, respectively, are performed by a Transform portion of this ETL process. The saving ETL package also provides the bookstore's savings to the report generator module as described at arrow 6-6 using a Load portion of the ETL process.

Auditing Interchange Categories

This section sets forth one example way in which the tools audit interchange categories assigned to credit-card transactions. It continues the example of the bookstore, but may be separate from or integral with the Building and Adjusting Baseline Interchange Rates, Auditing and/or Determining Ways in which to Alter Interchange Categories, and Determining Card-Issuer Interchange-Fee Savings sections.

In this example, interchange module 116 determines, automatically and without user interaction, whether interchange categories assigned to a merchant's credit-card transactions are correct. The interchange module, in conjunction with other elements of exemplary embodiment 100, can determine whether hundreds of thousands of credit-card transactions or groups of transactions were assigned a correct interchange category.

Figure 7:
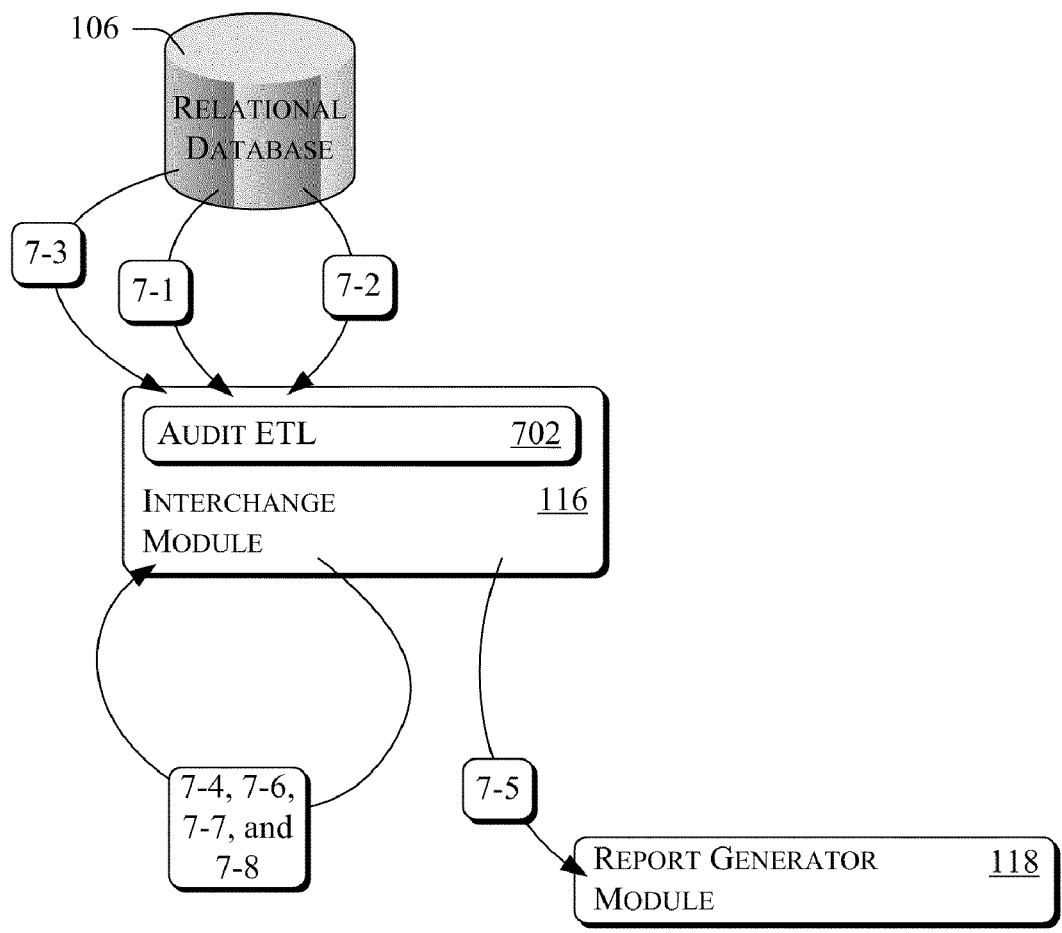
FIG. 7 illustrates an example flow diagram in which the tools audit interchange categories assigned to credit-card transactions.

Turning to FIG. 7, at arrow 7-1 the interchange module receives interchange-category parameters for each of the interchange categories assigned to a particular merchant and to which credit-card transactions were assigned or may potentially be correctly assigned. These parameters may change over time, so the interchange module receives parameters used for a particular billing cycle in which the credit-card transactions were transacted or batched. A (fictitious) VISA® Education interchange category, for example, includes an interchange-category parameter requiring that the merchant receiving the credit-card transaction be in an education business area and have a non-taxable status.

These published interchange-category parameters are published by the card issuer of that interchange category, such as VISA® or MasterCard®. They may be published on a website, made available through APIs, or distributed to interested parties in electronic or paper form. In any case, these published interchange-category parameters are entered into relational database by data-entry entity 104 in any of the manners described above for entering data (not shown in FIG. 7).

At arrow 7-2, the interchange module receives a merchant's interchange-category parameters. Continuing the bookstore example, assume that the interchange module receives interchange-category parameters for all of the bookstore's merchants and that one of its merchants is in an education business section but has a taxable status (e.g., a for-profit text-book store owned by the national bookstore chain). These parameters are received by the interchange module from the relational database after being stored in the database by data-entry entity 104 either manually or electronically.

At arrow 7-3, the interchange module receives credit-card transaction data indicating groups of credit-card transactions and their assigned interchange categories. Assume that the merchant at issue is the for-profit text-book store owned by the national bookstore chain.

Consider the following groups of transactions and their assigned interchange categories for this text-book store:

At arrow 7-4, the interchange module determines whether or not the interchange categories assigned to all transactions and for all of the client's merchants during a billing cycle are correct. Continuing this example, the interchange module compares the interchange-category parameters for the text-book store with those required for the VISA® Education interchange category. The VISA® Education interchange category requires that the merchant have a non-taxable status. Here the text-book store is for-profit and so has a taxable status. Thus, the interchange module determines that the group of transactions assigned the VISA® Education interchange category were incorrectly assigned this category.

For each transaction or group of transactions that are correctly assigned, the interchange module records this finding in the relational database. For each transaction or group of transactions that are not correctly assigned, the interchange module can proceed to indicate this finding and the other pertinent information (the merchant, the reason the assigned category was incorrect, and credit-card transaction data about the transaction(s)) to report generator module 118 at arrow 7-5, or continue first to 7-6 to compute a savings or loss.

At arrow 7-6, the interchange module determines the correct interchange category based on comparing published

| FEES NUMBER | AMOUNT | DESCRIPTION | TOTAL |
| --- | --- | --- | --- |
|  |  | SUPPORT PACKAGE | 5.95 |
| 02 | 14.00 | TERMINAL FEE | 28.00 |
| 10 | 586.95 | VISA ® STANDARD (2.63%XSALES + $.10XITEMS) | 16.44 |
| 350 | 12,452.24 | VISA ® RTL CK DB (1.05%XSALES + $.15XITEMS) | 183.25 |
| 461 | 27,404.65 | VISA ® CPS RETAIL (1.54%XSALES + $.10XITEMS) | 468.13 |
| 57 | 3,431.71 | VISA ® EDUCATION (2.14%XSALES + $.10XITEMS) | 79.14 |
| 16– | 662.12– | VISA ® CREDIT CONSUMER CARD @ 1.67% | 11.06– |
| 01– | 6.37– | VISA ® CREDIT COMMERCIAL CARD @ 2.24% | .14– |
| 47 | 1,716.92 | VISA ® EIRF DB (1.75%XSALES + $.20XITEMS) | 39.45 |
| 02 | 92.90 | VISA ® STANDARD DB(1.90%XSALES + $.25XITEMS) | 2.27 |
| 09– | 257.19– | VISA ® CV-CNSR DB (1.31%XSALES) | 3.37– |
|  | 52,203.43 | VISA ® DUES AND ASSESSMENTS (.0925%XSALES) | 48.29 |
| 10 | 1,577.69 | MC STANDARD (2.70%XSALES + $.10XITEMS) | 43.60 |
| 522 | 32,284.36 | MC MERIT 3 (1.54%XSALES + $.10XITEMS) | 549.38 |
| 06 | 1,579.45 | MC KEY ENTERED (1.90%XSALES + $.10XITEMS) | 30.61 |
| 81 | 3,821.95 | MC CORP DATA RT1(2.65%XSALES + $.10XITEMS) | 109.38 |
| 16 | 604.03 | MC STANDARD DB (1.90%XSALES + $.25XITEMS) | 15.48 |
| 10 | 203.57 | MC KEY ENTER DB (1.64%XSALES + $.16XITEMS) | 4.94 |
| 929 | 37,417.09 | MC MERIT 3 DB (1.05%XSALES + $.15XITEMS) | 532.23 |
| 19– | 371.74– | MC CONS DB RF 3 @1.40% | 5.20– |
| 19– | 668.64– | MC CONS CR RF 4 @1.77% | 11.83– |
| 02– | 139.68– | MC CORP CR RF 3 @2.15% | 3.00– |
|  | 77,488.14 | MC DUES AND ASSESSMENTS(.095%XSALES) | 73.61 |
| 65 | 6,311.88 | VISA ® BUS ELECT (2.20%XSALES + $.10XITEMS) | 145.36 |
| 05 | 206.18 | VISA ® BUS STD (2.70%XSALES + $.10XITEMS) | 6.07 |
| 296 |  | DISCOVER AUTHORIZATIONS @ 15 CENTS | 44.40 |
|  |  | OTHER FEES DUE | 2,391.38 |

Note the bolded group of credit-card transactions and their category: VISA® Education (not a real category; it is for example purposes). As noted above, this category requires that the merchant receiving the credit-card transaction be non-taxable and in the education business sector.

At this point the interchange module has the following information: the published interchange-category parameters for VISA® Education; the interchange-category parameters for the text-book store; and that a group of transactions have been assigned this VISA® Education category. The interchange module also has credit-card transaction data about this group of transactions: the number of transactions; amount of the transactions; and amount of the interchange fee charged.

interchange-category parameters for various interchange categories with the interchange-category parameters for the merchant.

For the VISA® Education group of transactions the interchange module determines that VISA® EIRF DB is correct because VISA® EIRF DB applies to merchants with a taxable status with an education business section (and others), and because the transactions were handled in a particular manner (i.e., following EIRF DB's requirements).

At arrow 7-7, the interchange module determines the correct interchange-category fee that should have been charged. Here EIRF DB should have been applied instead of Education. VISA® Education's fee is 2.14% times the amount plus $0.10 per transaction, with a charged fee of $79.14. The interchange module determines the correct fee, which for VISA® EIRF DB is:

VISA® EIRF DB=1.75%×Sales+$0.20×Items

For the group at issue, this computes to:

VISA® EIRF DB=1.75%×$3,431.71+$0.20× 57=$60.05+$11.40=$71.45

At arrow 7-8, the interchange module determines the savings or loss, here:

Savings=$79.14–$71.45=$7.69

Following arrow 7-8, the interchange module sends this savings information to the report-generator module according to arrow 7-5.

The interchange module performs the actions of arrows 7-1 to 7-8 using an Audit ETL package 702, shown included in the interchange module in FIG. 7. The acts of arrows 7-1, 7-2, and 7-3 by an Extract portion, the acts of arrows 7-4, 7-6, 7-7, and 7-8 by a Transform portion, and the act of arrow 7-5 by a Load portion of an ETL process caused by the computing device executing the Audit ETL package.

Other Embodiments of the Tools

Figure 8:
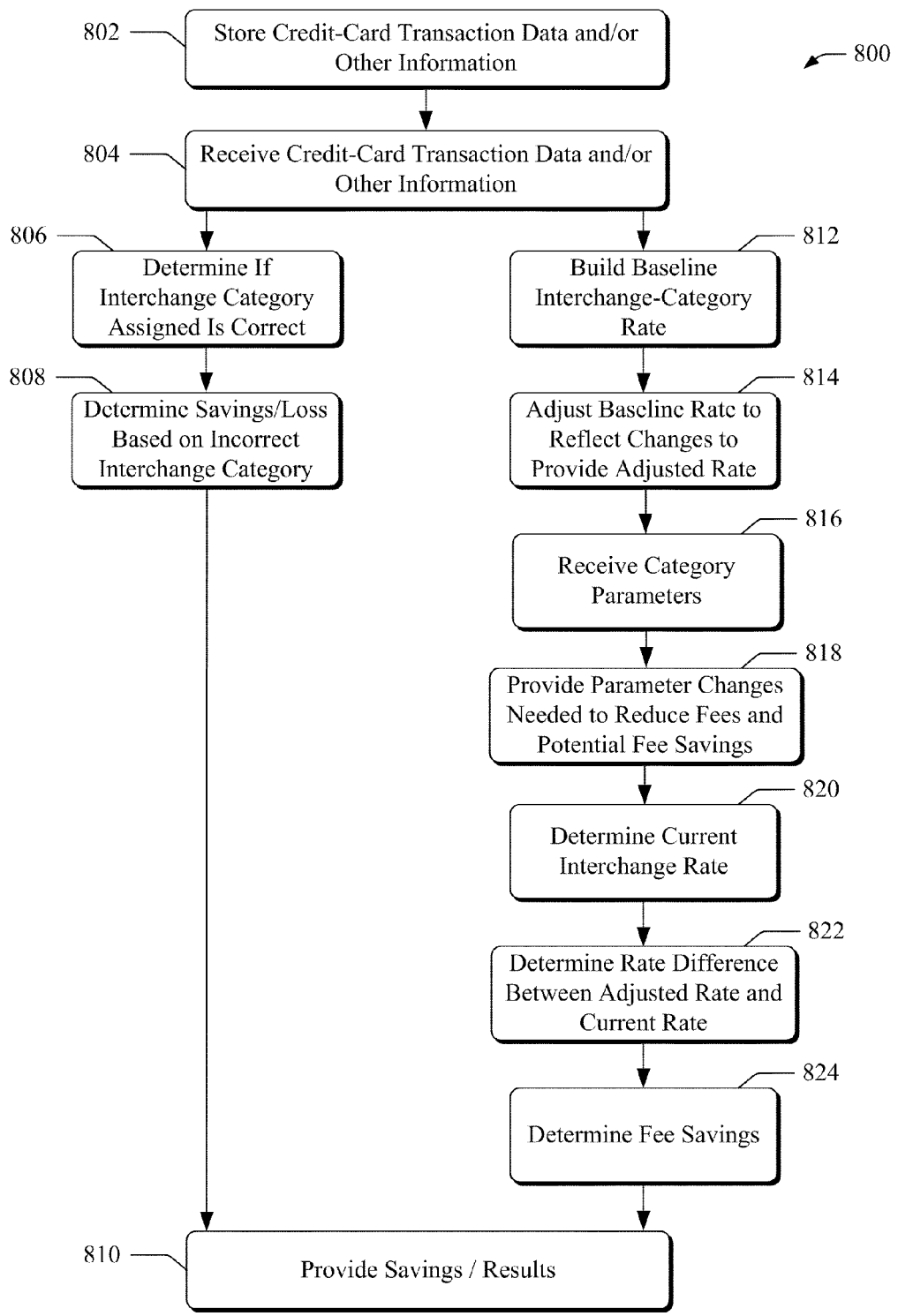
FIG. 8 illustrates an example process illustrating some ways in which the tools may act to audit and/or track fee reductions for interchange fees and their categories, as well as other actions.
Figure 9:
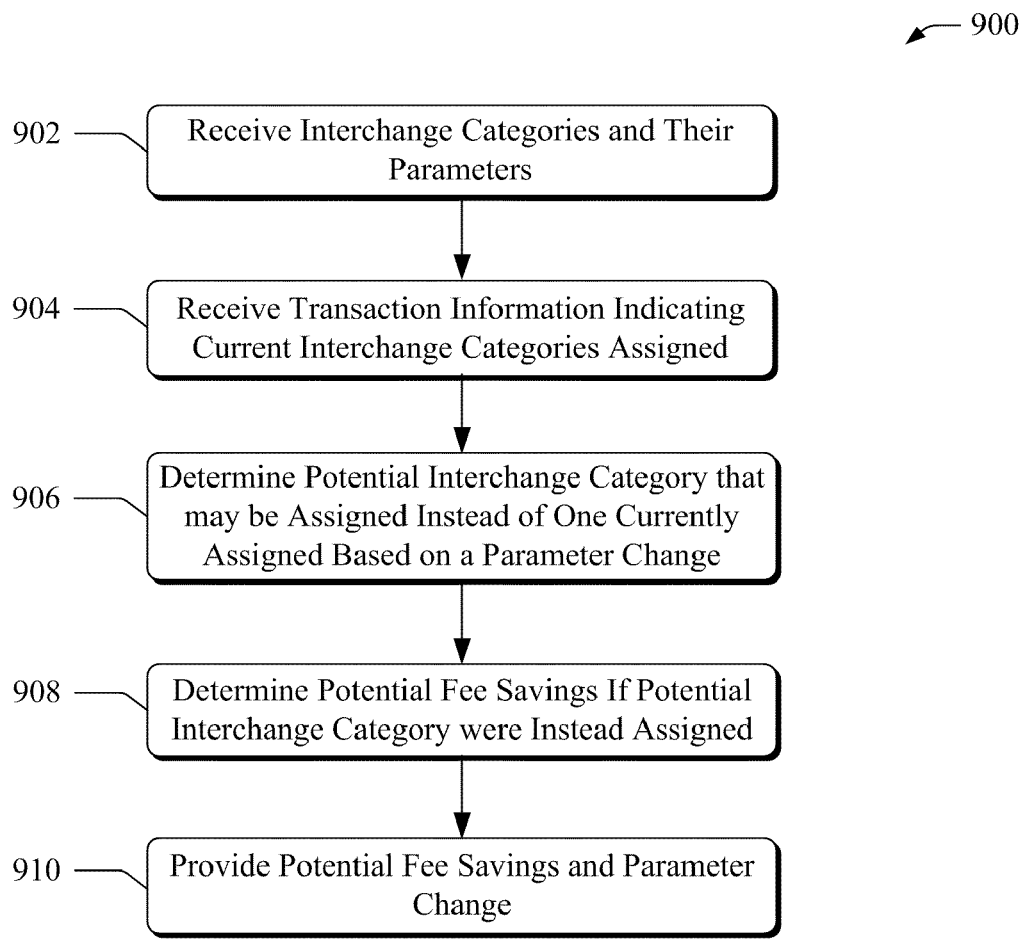
FIG. 9 illustrates an example process illustrating some ways in which the tools may act to alter interchange categories.

Processes 800 and 900 of FIGS. 8 and 9 describe additional embodiments of the tools to those described above. These processes and the example processes and flow diagrams described or illustrated in FIGS. 2-4 and 6-7 may be implemented in any suitable hardware, software, firmware, or combination thereof; in the case of software and firmware, these processes represent sets of operations implemented as computer-executable instructions stored in computer-readable media and executable by one or more processors (e.g., processor(s) 110 and computer-readable media 112). These embodiments of the tools described in this section are not intended to limit the scope of the tools or the claims.

Block 802 stores credit-card transaction data and other information, such as interchange categories and their published parameters. This information may be stored into a rational database in one or more textual, human-readable formats or in one easily-machine-usable format. In cases were it is stored in more than one format or in a less-desired format, it may be transformed into a format designed for consumption by the tools, such as interchange module 116. The stored credit-card transaction data may include any information made available through a merchant-processor statement or made available by a merchant processor, including individual transactions. Examples of this act of storing and various types of information and credit-card transaction data, as well as an example of transforming formats, are set forth above.

Block 804 receives credit-card transaction data from a rational database for credit-card transactions accepted through one or more merchants and/or other information. Each of these merchants may be identified by its own merchant identifier. As noted above, the data may be received by retrieving the credit-card transaction data using an Extract portion of an Extract, Transform, and Load (ETL) process. This credit-card transaction data and other information may be received periodically, such as each calendar month for billing cycles, or historical, such as to build a baseline interchange rate as described above.

The information received may be for multiple merchants, each of the merchants having received customer purchases during a same time period, such as a particular billing cycle, or having batched their respective customer purchases during this period. The merchants can be associated with a single client or otherwise. If associated with a single client (e.g., the 2,000 merchants of the national bookstore chain), each may be associated based on its merchant identifier and a list of merchant identifiers for that single client.

Block 804 may receive the information based on its merchant identifier, such as all information from merchant-processor statements having a particular merchant identifier. Thus, the tools may receive, automatically, without user interaction, from a relational database, and using the merchant identifiers, credit-card transaction data for credit-card purchases for all merchants of a particular client.

Block 804 may also receive interchange parameters. Here published interchange parameters may be for each of interchange categories assigned and each other type of interchange category to which each of the credit-card transactions of a merchant may potentially be correctly assigned. Examples of these interchange parameters are set forth above.

After receiving the information at block 804, the tools may proceed to audit interchange categories assigned or calculate savings since an historical period or both. The discussion turns first to auditing interchange categories (starting at block 806) and then to calculating savings (starting at block 812).

Block 806 determines if an interchange category assigned to a particular transaction or group of transactions is correct. Block 806 may do so for groups of transactions based on information in a merchant-processor statement or otherwise made available, such as described in the bookstore examples above.

Block 806 may also do so for individual transactions. Determining correct interchange categories for individual transactions may be performed like groups above, but doing so for individual transactions permits greater analysis because each transaction may or may not be correctly assigned based not just on a merchant's status, but also the specifics of a transaction.

For example, if a particular transaction is assigned a Card Not Present type of interchange category and the tools have information about that particular transaction, the tools may determine, based on parameters for the transaction, such as the credit card actually being present at the time of the transaction, that it was incorrectly assigned.

In some embodiments, block 806 may be performed using an Extract portion of an Extract, Transform, and Load process, such as described above (e.g., ETL 206 of FIG. 2).

Following block 806, the tools may proceed to indicate its findings or proceed to determine a savings or loss based on the incorrect assignment at block 808. In either case block 810 provides results of the tools' determination, here that one or more transactions have been assigned an incorrect card-issuer interchange category.

Block 808, responsive to the tools determining that an interchange category was incorrectly assigned to a transaction or group of transactions, determines a savings or loss between the incorrectly assigned interchange-category's rate and the correct interchange-category's rate. The tools may do so by calculating a correct fee for the applicable transaction at the correct rate and subtracting the incorrect fee. The tools may provide this information to block 810 to report.

Starting with block 812, the tools build a baseline card-issuer interchange rate for a merchant or group of merchants. Block 812 may do so by receiving credit-card transaction data for multiple historical billing cycles and for each merchant of a group of merchants, such as those associated with a particular client. The tools may base this baseline rate on card-issuer interchange fees associated with card-issuer interchange categories assigned to credit-card transactions and dollar volumes on which the card-issuer interchange fees are charged. The card-issuer interchange fees and dollar volumes can be received from multiple historic merchant-processor statements of the particular merchant and over a historical period.

In the bookstore example above, the tools, through interchange module 116, extract card-issuer interchange fees and the dollar volumes from credit-card transaction data in a relational database and transform the card-issuer interchange fees and the dollar volumes into the baseline card-issuer interchange rate by dividing the card-issuer interchange fees by the dollar volumes. In some examples described above, the interchange module performed these acts automatically using an ETL process.

With the baseline determined, block 814 adjusts the baseline card-issuer interchange rate based on rate changes. Block 814 adjusts the baseline rate based on rate changes made during or after the historical period to the card-issuer interchange categories assigned to credit-card transactions of the particular merchant over the historical period.

In more detail, the tools may receive a rate change to the particular card-issuer interchange category for the group of credit-card transactions assigned to that category, determine a fee change based on the dollar volume of the group and the rate change, receive or determine a total interchange fee charged during the historical period based on a total dollar volume and the baseline card-issuer interchange rate, and add or subtract the fee change for the group from the total interchange fee charged during the historical period. By so doing the tools provide an adjusted baseline interchange fee, which the tools divide by the total dollar volume to determine an adjusted baseline interchange rate.

In the bookstore example, for instance, the tools adjusted the baseline interchange-category rate based on an interchange-category's rate changing from 1.54% and $0.10 per transaction to 1.55% and $0.11 per transaction.

With the adjusted baseline interchange-category rate available, the tools may proceed to blocks 816 and 818 or proceed direct to block 820.

Block 816 receives card-issuer interchange category parameters sufficient to determine parameter changes that are effective to replace a higher-cost interchange category with a lower-cost interchange category. The parameters received may include all parameters by which card issuers decide which interchange category to assign to transactions, such as a merchant's area of business, information received for a transaction, how information was received for the transaction, and a type of card used in the transaction. Examples of these parameters are set forth in the examples illustrated in FIGS. 4 and 5 above.

Block 818 provides parameter changes needed to reduce fees. Block 818 may also provide the potential fee savings associated with each of these changes, such as indicating that a merchant will save $4,302 on a same amount and number of transactions as a prior merchant processor statement if the merchant will implement a new data-intake procedure (e.g., entering the 3-digit number on the back of a credit card for an over-the-phone transaction). Examples of parameters changes and potential savings are described above in relation to FIGS. 4 and 5.

Block 820 determines a current card-issuer interchange rate for a current billing cycle. This current rate may be lower than it would otherwise have been because a merchant implemented parameter changes suggestions by the tools at block 818. Blocks 816 and 818, however, are not required for the tools to implement block 820 or any other block of process 800.

The tools perform the actions of block 820 by calculating a card-issuer interchange fee for each of the merchants and the dollar volume of credit-card purchases for all of the merchants and on which the card-issuer interchange fees charged are assessed. Dividing the total fee for all merchants by this dollar volume results in a current interchange rate averaged over all the merchants.

The tools then determine a rate difference between the adjusted baseline and the current rate at block 822. Block 822 may determine this difference automatically by subtracting one from the other.

Block 824 determines a fee savings based on the rate change (if any). The tools may determine this savings, automatically and without user interaction, based on a credit-card dollar volume for the credit-card transactions during the current billing cycle and the determined rate difference.

Responsive to determining a fee savings at block 824 and/or a fee savings based on an incorrectly assigned interchange category at block 808, the tools provide these fee savings at block 810. Block 810 also provides other information and/or performs some calculations. In one case the tools provide a report, in a human-readable format, showing which of the credit-card transactions to which an interchange category assigned were not correct and an associated fee savings or loss. In another case the tools provide a report to a particular client setting out various fee savings or net savings and a contractually agreed-on percentage of the fees due.

Each of the above acts involving receiving or retrieving information of any sort, a calculation (e.g., add, divide, subtract), or enabling the tools to provide results may be performed automatically and without user interaction, such as through execution of one or more ETL packages. Example ETL packages are described as part of the bookstore example above. The tools, through these ETL packages or otherwise, may provide reports to users that compile savings over hundreds of thousands of credit-card transactions.

Process 900 in FIG. 9 illustrates, in additional detail, actions performable by the tools in relation to blocks 816 and 818 of FIG. 8, though process 900 may act independent from blocks 816, 818, and any of process 800 (and likewise process 800 from process 900).

Block 902 receives interchange categories and one or more of their parameters, the parameters including: merchant's area of business, information received for a transaction, how information is received for a transaction, and type of card used in a transaction. The tools may receive all possible interchange categories or a subset of these. As noted in the above example, there are currently VISA® and MasterCard® interchange categories, most of which have parameters used to determine when each is assigned to a credit-card transaction. The tools may actively retrieve or receive most-current parameters and pricing so that the tools' analysis is kept up-to-date.

Block 904 receives transaction information for a particular merchant. This transaction information may include which transactions have been assigned which categories and the merchant's currently assigned and/or potential business area. The transaction information may include credit-card transaction data and be received from a relational database in an easily-computer readable format, as provided in some examples above. The transaction information may group transactions or list them separately. Also, the transaction information may indicate the parameters and pricing for each category or may not. If this information is not included the tools may retrieve or receive it, such as at block 902.

Based on the information received at blocks 902 and 904, block 906 determines, for at least one assigned interchange category received at block 904 and at least one interchange category received at block 902, which potential interchange category may be assigned instead of one currently assigned.

Thus, the tools may determine which interchange categories have a lower cost than a currently-assigned interchange category. In one example above, the tools act through the category module and its entity to determine which categories having lower fees than others and also have parameters that may realistically be changed by the merchant. The parameter changes do not necessarily have to be implemented by the merchant making some sort of change; as noted above, the change may be changing the merchant's area of business with the card issuer and/or merchant processor. In this case the fee savings may even be retroactive, and thus actual rather than potential (e.g., by changing a merchant from "retail" to "retail education").

Block 906 may determine all interchange categories that have better pricing, and some or only the best based on changes a merchant is likely to want to make. The tools, for example, may only indicate interchange categories that may be attained through changes that do not include changing the type of card, as this may be difficult to do. Also for example, a merchant may be informed only that the best potential savings are to change its area of business to improve a particular interchange category (e.g., from EIRF 510 to CPS Retail 2 Emerging Markets 508 as shown in FIG. 5). The tools, at block 906, may determine all of these potential improvements to interchange categories, not just those within a particular area of business, as one example above describes.

Block 908 determines a potential fee savings if the one or more transactions assigned an interchange category were instead assigned another, lower-cost interchange category. The tools may do so for all possible interchange category changes or a subset, as noted above. In the above example, the tools act through the category module to determine potential interchange category improvements and a potential savings for each.

Block 910 provides the potential fees savings and, in some cases, the parameter change needed to potentially bring about these potential fee savings. Thus, block 910 may indicate (e.g., through report generator module 118) to a merchant or client that by requiring its personnel to answer a query with "No" for some types of transactions will potentially save the merchant (and the client) a certain amount of money in interchange category fees assessed by a card issuer (e.g., VISA® or MasterCard®).

In some cases the suggested parameter change may already be performed by a merchant. In these cases, the merchant may indicate this to its merchant processor and thereby retroactively save fees. In at least this way the tools may act to audit interchange category fees in additional to the manners set forth in the section entitled Auditing Interchange Categories.

Each of blocks 902, 904, 906, 908, and 910 may be performed automatically and without user interaction. Thus, the tools (e.g., category module 120) may act to receive interchange categories and their parameters (e.g., from card issuers), receive credit-card transaction data (e.g., from merchant processors or a relational database after they were previously gathered and transformed) for a merchant, determine parameter changes, determine potential fee savings, and provide these parameters and savings. Note also that each of these blocks may be performed many, many times. For the national bookstore example, the tools may find potential fee savings for dozens of currently-assigned interchange categories for each of the 2,000 merchants of a client. All of this may be performed automatically such that a client receives, either for all merchants or merchant grouped by similarities, parameter changes and potential fee savings if these parameter changes are made. As noted above, interchange category fees amount to many billions of dollars worldwide. The tools may save clients and their merchants a significant amount of money in these fees by analyzing the interchange categories and each merchant's transaction information.

CONCLUSION

The above-described tools are capable of determining ways in which to alter interchange categories assigned to credit-card transactions and accompanying potential fee savings. The tools may do so automatically and with user interaction for one or even hundreds of merchants, thereby potentially saving the merchant or a client associated with these many merchants thousands if not millions of dollars in interchange fees. Although the tools have been described in language specific to structural features and/or methodological acts, it is to be understood that the tools defined in the appended claims are not necessarily limited to the specific features or acts described. Rather, the specific features and acts are disclosed as example forms of implementing the tools.

The invention claimed is:

1. One or more computer-readable storage media having computer-readable instructions therein that, when executed by a computing device, cause the computing device to perform acts comprising:
   receiving, by the computing device, interchange categories, their pricing, and one or more of their parameters, their parameters including one or more of: a client's area of business; information received for a transaction; how the information is received for the transaction; or a type of card used in the transaction;
   receiving, by the computing device, transaction information for the client, the transaction information indicating one or more current transactions having been assigned a first interchange category of the received interchange categories;
   determining, by the computing device, that a second interchange category having a lower cost than the first interchange category and also of the received interchange categories is potentially assignable to the one or more current transactions or future transactions similar to the one or more current transactions by making a change in information that is provided by the client to determine one or more of the parameters;
   determining, by the computing device, a potential fee savings based on the received interchange categories and their pricing if the one or more current transactions assigned the first interchange category were instead assigned the second interchange category; and
   providing an indication of the change in information to the client.

2. The storage media of claim 1, wherein the first and second interchange categories comprise a same client's area of business and a same type of card, and wherein the second interchange category provides the greatest potential fees savings of any possible interchange category that has the same client's area of business and the same type of card.

3. The storage media of claim 1, wherein the client comprises one or more merchants.

4. The storage media of claim 1, wherein the change in information comprises a change to how the information is received.

5. The storage media of claim 1, further comprising providing an indication of the potential fee savings to the client.

6. The storage media of claim 1, further comprising:
   determining an assigned area of business for the client based on the received transaction information;

receiving a correct area of business for the client;

determining that the second interchange category should have been assigned based on the correct area of business; and indicating to the client that the first interchange category was incorrectly assigned or that the second interchange category should have been assigned based on the correct area of business.

7. The storage media of claim 1, further comprising:

determining that third and fourth interchange categories each having a lower cost than the first interchange category and also of the received interchange categories are potentially assignable to the one or more current transactions or future transactions similar to the one or more current transactions by making a second change in information that is provided by the client to determine one or more of the parameters for the third category and a third change in information that is provided by the client to determine one or more of the parameters for the fourth category;

determining second and third potential fee savings for each of the third and fourth categories, respectively, if the one or more current transactions assigned the first interchange category were instead assigned the third or fourth category; and providing the second and third changes in information.

8. The storage media of claim 1, wherein all of the acts are performed by the computing device automatically and without user interaction.

9. The storage media of claim 1, wherein the act of receiving interchange categories and one or more of their parameters is performed effective to receive the most-current parameters and most-current pricing for all of the received interchange categories.

10. One or more computer-readable storage media having computer-readable instructions therein that, when executed by a computing device, cause the computing device to perform acts comprising:

receiving, by the computing device, interchange categories currently being assigned by card issuers, pricing for each interchange category, and parameters used to determine which transactions should be assigned which interchange category, the parameters including one or more of: a client's area of business; information received for transactions; or how information is received for the transactions;

determining, by the computing device and for interchange categories having or allowing the client's area of business and based on the pricing of these interchange categories, higher-cost interchange categories capable of being replaced by lower-cost interchange categories;

determining, by the computing device, one or more changes in information that is provided by the client to determine one or more of the parameters effective to cause each of the lower-cost interchange categories to be assigned instead of each of the higher-cost interchange categories; and providing the one or more changes in information to the client.

11. The storage media of claim 10, further comprising providing the one or more changes in information effective to enable a particular client having the client's area of business to lower its interchange category fees.

12. The storage media of claim 10, further comprising:

receiving credit-card transaction data for the client, the credit-card transaction data indicating that transactions for the client are assigned one of the higher-cost interchange categories;

determining a potential fee savings if one of the lower-cost interchange categories were assigned to the transactions for the client instead of said one of the higher-cost interchange categories;

determining a particular change in information to determine a parameter needed to cause said one of the lower-cost interchange categories to be assigned instead of said one of the higher-cost interchange categories; and providing the particular change in information and the potential fee savings.

13. The storage media of claim 12, further comprising performing the acts of determining a potential fee savings and determining a particular change in information to determine a parameter for a second of the lower-cost interchange categories effective to determine a second potential fee savings and a second particular change in information to determine another parameter, and wherein the act of providing provides the second potential fee savings and the second particular change in information to determine the other parameter.

14. The storage media of claim 12, wherein the act of receiving credit-card transaction data receives the credit-card transaction data from a relational database for credit-card transactions accepted through the client, the credit-card transaction data indicating, for all credit-card transactions or groups of credit-card transactions, interchange categories assigned, the media further comprising:

analyzing all of the interchange categories assigned to determine which of the interchange categories assigned are higher-cost interchange categories, and wherein:

the act of determining a potential fee savings is performed for each of the determined higher-cost interchange categories that were assigned;

the act of determining a particular change in information to determine a parameter is performed for each of the determined higher-cost interchange categories that were assigned; and the act of providing provides each particular change in information to determine a parameter and each potential fee savings for each of the determined higher-cost interchange categories that were assigned.

15. The storage media of claim 10, wherein the media causes the computing device to perform the acts of determining changes in information to determine one or more parameters and providing the changes in information for every client in a group of clients.

16. The storage media of claim 10, wherein the particular client includes the client.

17. The storage media of claim 10, wherein the client comprises one or more merchants.

18. One or more computer-readable storage media having computer-readable instructions therein that, when executed by a computing device, cause the computing device to perform acts comprising:

receiving, by the computing device and for a particular business area, a change in information used to determine a parameter capable of replacing a higher-cost interchange category with a lower-cost interchange category;

receiving, by the computing device, credit-card transaction data for an entity having the particular business area, the credit-card transaction data indicating that transactions for the entity are assigned the higher-cost interchange category; and determining, by the computing device, a potential fee savings if the lower-cost interchange category were assigned to the transactions instead of the higher-cost interchange category; and providing an indication of the change in information to a client associated with the entity.

19. The storage media of claim 18, wherein the change in information used to determine the parameter comprises a change to a how-the-information-is-received-for-a-transaction parameter of the higher-cost interchange category.

20. The storage media of claim 18, further comprising providing one or more of the change in information or the potential fee savings.

21. The storage media of claim 18, further comprising:

extracting text-format, pre-transformation credit-card transaction data;

transforming the extracted text-format, pre-transformation credit-card transaction data into an easily-machine-usable format; and loading the data in the easily-machine-usable format into a relational database, and wherein the act of receiving the credit-card transaction data receives the credit-card transaction data in the easily-machine-usable format.

22. The storage media of claim 18, wherein the act of receiving a change in information used to determine a parameter receives additional changes in information used to determine one or more parameters capable of replacing additional higher-cost interchange categories with additional lower-cost interchange categories, the act of receiving credit-card transaction data receives additional credit-card transaction data indicating that additional transactions for the entity are assigned the additional higher-cost interchange categories, the act of determining determines additional potential fee savings if the additional lower-cost interchange categories were assigned to the additional transactions instead of the higher-cost interchange category.

23. The storage media of claim 22, wherein all of the acts are performed by the computing device automatically and without user interaction.

24. The storage media of claim 18, wherein the entity comprises one or more merchants.

\* \* \* \* \*